United States Patent
Marra et al.

(10) Patent No.: US 10,853,931 B2
(45) Date of Patent: *Dec. 1, 2020

(54) SYSTEM AND METHOD FOR STRUCTURAL INSPECTION AND CONSTRUCTION ESTIMATION USING AN UNMANNED AERIAL VEHICLE

(71) Applicant: EZ3D, LLC, Louisville, CO (US)

(72) Inventors: Martin Marra, Louisville, CO (US); James F. Smyth, Richmond, VA (US)

(73) Assignee: EZ3D TECHNOLOGIES, INC., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,235

(22) Filed: Jan. 11, 2019

(65) Prior Publication Data
US 2019/0206044 A1 Jul. 4, 2019

Related U.S. Application Data

(63) Continuation of application No. 15/411,182, filed on Jan. 20, 2017, now Pat. No. 10,217,207.
(Continued)

(51) Int. Cl.
*G06T 7/70* (2017.01)
*G06T 7/00* (2017.01)
(Continued)

(52) U.S. Cl.
CPC .......... *G06T 7/0004* (2013.01); *B64C 39/024* (2013.01); *B64D 47/08* (2013.01);
(Continued)

(58) Field of Classification Search
CPC ....... G06T 7/0004; G06T 19/00; G06T 19/20; G06T 2200/08; G06T 2207/10032;
(Continued)

(56) References Cited

U.S. PATENT DOCUMENTS 7,376,284 B2   5/2008   Tao et al.
7,509,241 B2   3/2009   Guo et al.
(Continued)

FOREIGN PATENT DOCUMENTS

CN   201110423560.4 B   4/2014
WO   2013123354 A1   8/2013
(Continued)

OTHER PUBLICATIONS

3OULAASSAL, H., et al_, Automatic Extraction of Planar Clusters and their Contours on Building Facades Recorded n. Terrestrial Laser Scanner, International Journal of Architectural Computing, Issue 01, vol. 7.
(Continued)

*Primary Examiner* — Howard D Brown, Jr.
(74) *Attorney, Agent, or Firm* — Lewis Brisbois Bisgaard & Smith

(57) ABSTRACT

An automated image capturing and processing system and method may allow a field user to operate a UAV via a mobile computing device to capture images of a structure area of interest (AOI). The mobile computing device receives user and/or third party data and creates UAV control data and a flight plan. The mobile computing device executes a flight plan by issuing commands to the UAV's flight and camera controller that allows for complete coverage of the structure AOI.

After data acquisition, the mobile computing device then transmits the UAV output data to a server for further processing. At the server, the UAV output data can be used for a three-dimensional reconstruction process. The server then generates a vector model from the images that precisely represents the dimensions of the structure. The server can then generate a report for inspection and construction estimation.

20 Claims, 15 Drawing Sheets

Related U.S. Application Data

(60) Provisional application No. 62/280,803, filed on Jan. 20, 2016.

(51) Int. Cl.
| | |
|---|---|
| *H04N 13/204* | (2018.01) |
| *G01C 11/00* | (2006.01) |
| *G01C 21/20* | (2006.01) |
| *G05D 1/00* | (2006.01) |
| *G06K 9/00* | (2006.01) |
| *G06T 19/00* | (2011.01) |
| *B64C 39/02* | (2006.01) |
| *B64D 47/08* | (2006.01) |
| *G06K 9/52* | (2006.01) |
| *G06T 19/20* | (2011.01) |
| *G08G 5/00* | (2006.01) |

(52) U.S. Cl.
CPC .............. *G01C 11/00* (2013.01); *G01C 21/20* (2013.01); *G05D 1/0038* (2013.01); *G05D 1/0094* (2013.01); *G06K 9/00637* (2013.01); *G06K 9/52* (2013.01); *G06T 19/00* (2013.01); *G06T 19/20* (2013.01); *G08G 5/0034* (2013.01); *H04N 13/204* (2018.05); *B64C 2201/12* (2013.01); *B64C 2201/127* (2013.01); *G06T 2200/08* (2013.01); *G06T 2207/10032* (2013.01); *G06T 2207/30108* (2013.01); *G06T 2215/16* (2013.01)

(58) Field of Classification Search
CPC ...... G06T 2207/30108; G06T 2215/16; B64D 47/08; G05D 1/0038; G05D 1/0094; G06K 9/52; G06K 9/00637; G08G 5/0034; G01C 11/00; G01C 21/20; H04N 13/204; B64C 2201/12; B64C 2201/127; B64C 39/024
See application file for complete search history.

(56) References Cited

U.S. PATENT DOCUMENTS

| | | | |
|---|---|---|---|
| 7,728,833 B2 | 6/2010 | Verma et al. | |
| 8,346,578 B1 | 1/2013 | Hopkins, III et al. | |
| 8,531,472 B2 | 9/2013 | Freaund et al. | |
| 8,649,632 B2 | 2/2014 | Neophytou et al. | |
| 8,731,234 B1 | 5/2014 | Ciarcia et al. | |
| 8,805,058 B2 | 8/2014 | Zebedin | |
| 8,897,539 B2 | 11/2014 | Stone et al. | |
| 9,082,015 B2 | 7/2015 | Christopulos et al. | |
| 9,658,619 B1 * | 5/2017 | Bethke | G08G 5/0069 |
| 2008/0262789 A1 | 10/2008 | Pershing et al. | |
| 2009/0096884 A1 | 4/2009 | Schultz et al. | |
| 2010/0110074 A1 | 5/2010 | Pershing | |
| 2010/0286859 A1 | 11/2010 | Feigh et al. | |
| 2013/0317667 A1 | 11/2013 | Kruglick | |
| 2014/0018979 A1 * | 1/2014 | Goossen | G08G 5/0034 701/3 |
| 2014/0324483 A1 | 10/2014 | Plummer et al. | |
| 2014/0316614 A1 | 11/2014 | Newman | |
| 2015/0029182 A1 | 1/2015 | Sun et al. | |
| 2015/0347872 A1 | 12/2015 | Taylor et al. | |
| 2016/0244187 A1 * | 8/2016 | Byers | A47G 29/14 |
| 2016/0307447 A1 * | 10/2016 | Johnson | B60L 58/12 |
| 2017/0205826 A1 * | 7/2017 | Smith | G05D 1/0094 |
| 2017/0206648 A1 * | 7/2017 | Marra | G05D 1/0038 |
| 2017/0278409 A1 * | 9/2017 | Johnson | G08G 5/0013 |
| 2018/0046187 A1 * | 2/2018 | Martirosyan | G05D 1/0094 |
| 2018/0178667 A1 * | 6/2018 | Cumoli | B60L 53/36 |
| 2018/0321692 A1 * | 11/2018 | Castillo-Effen | G05D 1/0094 |
| 2018/0329433 A1 * | 11/2018 | Zhao | G05D 1/0276 |

FOREIGN PATENT DOCUMENTS

| | | |
|---|---|---|
| WO | 2014170060 A1 | 10/2014 |
| WO | 2015105886 A1 | 7/2015 |

OTHER PUBLICATIONS

Rothermel, M., Fast and Robust Generation of Semantic Urban Terrain Models from UAV Video Streams, Institute for Photogrammetry Stuttgart University, 2014.

Yuxiang, He, Automated 3D Building Modelling From Airborne Lidar Data, Final Thesis, University of Melbourne, Feb. 2015.

James, M., Mitigating Systematic Error in Topographic Models Derived from UAV and Ground-Based Image Networks, Earth SUrface Processes and Landforms, Jun. 19, 2014, vol. 39. p. 1413-1420.

Jwa, Y., An Implicit Geometric Regularization of 3D Building Shape Using Airborne Lidar Data, www.researchgate.net/publication/228347970, Jul. 2008.

Dai, Fei, Photogrammetric Error Sources and Impacts on Modeling and Surveying in Construction Engineering Applications, Visualization in Engineering, a SpringerOpen Journal, 2014, 2:2.

Dorniger, Peter, et al, A Comprehensive Automated 3D Approach for Building Extraction, Reconstruction, and Regularization from Airbourne Laser Scanning Point Clouds, Sensors 2008, ISSN 1424-8220, vol. 8, p. 7323-7343.

Hoppe, Christof, et al., Photogrammetric Camera Network Design for Micro Aerial Vehicles, Institute for Computer Graphics and Vision Graz University of Technology, Austria, 17th Computer Vision Winter Workshop, Feb. 2012.

Ruijin, Ma, Building Model Reconstruction from Lidar Data and Aerial Photographs, Dissertation, Ohio State University, 2004.

Lewis, G., UAS Volumetric Analysis, A case study, AirGon LLC, presentation paper.

Huang, H, et al, Rule-based Roof Plane Detection and Segmentation from Laser Point Clouds, Institute of Cartography and Geoinformatics, Leibniz University, Hannover, Germany, 2011.

Hongchao, F, et al, Segmentation of Sloped Roofs from Airborne LiDar Point Clouds Using Ridge-Based Hierarchial Decomposition, Remote Sensing ISSN 2072-4292, 2014 vol. 6, p. 3284-3301.

Tarsha-Kurdi, F., Extended RANSAC Algorithm for Automatic Detection of Building Roof Planes from LiDar Data, ResearchGate, www.researchgate.net/publication/228781826, Jan. 2008.

\* cited by examiner

SYSTEM AND METHOD FOR STRUCTURAL INSPECTION AND CONSTRUCTION ESTIMATION USING AN UNMANNED AERIAL VEHICLE

CROSS-REFERENCE TO RELATED APPLICATION

This application is a Continuation of U.S. patent application Ser. No. 15/411,182, filed on Jan. 20, 2017 which claims the benefit of U.S. Provisional Patent Application No. 62/280,803, filed on Jan. 20, 2016, which is hereby incorporated herein by reference for all that it discloses.

TECHNICAL FIELD

The present disclosure relates to a system and method for capturing and processing images and more particularly to an automated system and method for structural inspection and construction estimation using images from an unmanned aerial vehicle (UAV).

BACKGROUND

There has been a demonstrated widespread need for a better process to obtain three-dimensional measurement and high resolution imagery for inspection and documentation of structural features that are dangerous to access directly. Very large investments continue to be made to acquire oblique image archives that capture imagery over broad areas with relatively limited resolution, redundancy, and accuracy compared to the imagery attainable through the use of UAVs. Previously disclosed methods for UAV image and data acquisition conducive to three-dimensional modeling and efficient inspection lack adequate simplicity, reliability, and affordability for common usage by untrained operators.

Ground based survey techniques by contrast are notoriously slow, prone to obstructions, and often require acquisition expertise and deployment of expensive sensors. Previous aerial Computer Aided Design (CAD) structural modeling approaches that rely on image edge detection to delineate facet seams are prone to fail with shadows, low contrast lighting, low texture building material, gutters or subtle slope changes. Structure modeling from three-dimensional point clouds fail where point density or accuracy is inadequate to cover needed surface facets with sufficient redundancy.

For a variety of purposes, the condition of building exteriors regularly needs to be assessed to evaluate and to permit cost effective maintenance and repair. Likewise, detailed structure measurement is required prior to repair or renovation. Architectural design plans, if available, are often an insufficient measurement source due to the need for reliable and current as-built dimensional data.

The construction and insurance industries expend substantial time and effort in performing both inspection and measurement of structures. Experienced field workers often physically survey the structure and document the condition, scope, and cost of repairs. This assessment and estimation work is costly, time sensitive, and often dangerous. The resulting documentation is incomplete, subjective, and prone to dispute after the work is completed.

These problems are particularly pronounced for portions of a property that are difficult to observe due to the size, height, slope, and/or location of the structure. Repairs are often urgently needed after catastrophes or severe weather. Time pressures to complete those repairs can further increase the likelihood of delays, errors, and fraud. For example, many residential roofs will need to be inspected and measured by both roofers and insurance adjusters after a hailstorm. For steep roofs, safety concerns often require deployment of multiple field workers who typically collect and document measurements with tape measures and hand sketches. Roof condition is documented by a jumble of phone photos and surface chalk markings at precarious locations.

Installation of roof top solar arrays also require measurements of roof facets as well as protrusions such vent caps, vent pipes, vent stacks, antennae, and skylights that constrain array placement. Estimators climb up on roofs to subjectively assess where the arrays can be placed, the pitch and orientation of each facet with respect to the sun, and how much sunlight will be shadowed by nearby trees, air conditioning units, or neighboring buildings. Often a photo mosaic is captured by the technician from on top of the roof for a visual record of the roof area, but this perspective is highly obstructed compared to aerial photos. CAD modeling systems are available to precisely design solar array layout and forecast electrical yield of an array based on this information but the as-built CAD geometry including detailed protrusion locations and tree models are not readily obtainable from an efficient data collection and information extraction process.

Aerial photography. As the use of aerial-captured imagery and design models has become more prevalent in the insurance and construction industries, the associated deliverables result in the need for information that is more current, accurate, broadly available, and readily available to manage and repair structures of interest. Various features of a property critical for accurate construction or repair estimates are often not visible in aerial imagery archives because of limited coverage, inadequate resolution, occlusions from trees or roof overhangs, and out dated content. Limitations of resolution and camera perspectives also impact the detail, precision, and completeness of automatically obtainable three-dimensional measurement from these sparsely captured aerial archives which in turn leads to subjective and highly manual sketching techniques described in the prior art for design modeling.

The shortcomings of maintaining regional aerial image archives become more prevalent with the increasing costs of capturing and delivering large amounts of imagery, much of which is unusable for assessing the actual condition of structures and determining the accurate repair cost parameters. As users expect higher resolution with greater detail, dated or imprecise images are not easily corrected and translated into workable models for estimation since they are typically flown years in advance of damaging events over large areas.

Ground surveys. Even with expertly captured supplemental ground level photos, it is often time prohibitive or impossible to completely capture a structure's exterior because the images needed for thorough inspection and automated measurement cannot be obtained due to vegetation occlusions, structural self-occlusions, property boundaries, terrain, or the breadth of the property.

Structured light sensors such as Microsoft Kinect and Google Tango do not work at long range or in direct sunlight. Terrestrial tripod mounted laser scanners have been used with increasing popularity among professional surveyors over the last decade and provide centimeter level precision but this approach demands hours of acquisition and processing effort by trained technicians. Furthermore, this technique typically fails to capture the entire structural exterior, especially roofs, due to obstructions, difficulty in obtaining appropriate observation angles, hazards, and time required on site. This is especially true for structures that are built on hillsides, closely adjacent to other structures, or that are surrounded by shrubs, trees, or fencing.

Other UAV techniques. Some UAV mapping surveys may be performed from a series of downward pointing (nadir) photos captured in a linear grid pattern over an area of interest requiring a series of inefficient U-turn maneuvers and offering little or no overlap between the initial and final photos in the series. Tree tops severely disrupt image matching at low altitude and image collections that do not maintain persistent oblique focus on the structure to be measured will yield reduced accuracy because large groups of photos will not be usable to reconstruct the structure completely. Overlap between photos can become irregular if the photos are not captured precisely where and when planned from such piecewise linear trajectories. These inherent flaws yield reduced measurement accuracy—large groups of photos fail to provide a basis for the complete and consistent reconstruction of a structure. Furthermore, these techniques demand professional quality aircraft hardware to ensure precise aircraft positioning, attitude sensing, and camera stability especially in high wind or low light conditions.

Ground based GPS/GNSS correction with costly and heavy receivers may be needed to correct time varying errors. Cheap and lightweight rolling shutter cameras are not typically by the aerial survey community because of distortions introduced during photogrammetric matching from low redundancy photo collections. Even middle grade consumer camera systems are often blamed for inadequate photogrammetric reconstruction when in fact results could actually be improved with better image collection techniques.

Multi directional oblique camera rigs that are often used for three-dimensional reconstruction of structural facades are prohibitively heavy for affordable and safe micro UAVs. Nadir photos even from wide angle lens do not capture facades redundantly enough for reliable reconstruction. Oblique image coverage with UAVs has occasionally been demonstrated with ad hoc, unreliable, time-consuming manually steered acquisition procedures that are not generic or simple enough for casual field operators to use regularly.

Excessive data collection increases data transfer and management costs and reduces efficiency of remote inspection. High resolution oblique photos captured without a means to precisely mask out the unintended coverage of neighboring properties prior to distribution raises the possibility of privacy actions. More sophisticated UAV acquisition strategies demand either scarce a priori or compute intensive real-time three-dimensional models or do not ensure image collections are optimally designed for automated reconstruction and contains adequate context for easy visual inspection.

The three-dimensional reconstruction of structural surfaces captured with nadir or inadequate oblique imagery will contain conspicuous voids especially for lightly textured low contrast surfaces or surfaces that are partially obstructed by trees which makes automated three-dimensional vector modeling extremely challenging.

Aerial LIDAR. Much prior research has been devoted to modeling structures from LIDAR point clouds partly because laser measurements are quite precise from high altitude flights when captured with high cost sensor and inertial measurement systems. Automated point cloud clustering techniques have been proposed to convert sparse precise LIDAR data into structural point cloud models but fail to capture details of a meter or less in size due to limited point density (less than twenty points per meter).

Heavy high frequency LIDAR sensors can penetrate vegetation and reduce obstructions from trees compared to photogrammetric reconstruction obtained from a sparse photo acquisition. However, LIDAR systems cost over ten times more and are five times heavier than camera-only micro UAV systems that are manufactured in the millions for the consumer drone market. Furthermore, LIDAR systems cannot get resolution of ground-angle views of structures or areas of interest.

The lightest and most affordable LIDARs lack sufficient power or collection speed to make rapid and reliable data collection possible. The added cost, weight, and energy demands makes LIDAR infeasible for on demand field measurements of specific properties. Even if LIDAR was practical to use for measurement, camera data would still need to be collected as well for manual or automated visual inspection.

SUMMARY

An automated image capturing and processing system and method according to an embodiment allows a field user to operate a UAV via a mobile computing device to capture images of a structure area of interest (AOI). The mobile computing device displays the launch or home location where the UAV was initialized and will launch from and land near as part of the flight plan. The mobile computing device receives user and third party data which includes the property bounds, the structure area of interest (AOI), the structure AOI's height, and height of any obstacle(s).

In one embodiment the mobile computing device then creates UAV control data based at least in part on the user input data and/or the third party data. The UAV control data is then used by the mobile computing device to create a flight plan based at least in part on the UAV control data that assures that images and data capturing are taken at optimal distances and intervals for three-dimensional reconstruction with required resolution. In one embodiment, the UAV control data defines a flight plan composed of a launch trajectory and an acquisition trajectory that permits multiple images to be captured of the structure from a flight plan passing well above obstacles.

The mobile computing device transmits the UAV control data to a UAV via a communication link. The mobile computing device then executes a flight plan by issuing commands to the UAV's flight and camera controller comprising an orbit at a specified pitch angle that allows for complete coverage of the structure AOI. The mobile computing device executes a flight plan that also allows for omnidirectional orbital imaging that reduces obstructions both for inspection and three-dimensional reconstruction. The mobile computing device issues commands to the UAV's flight and camera controller via the UAV system's API to traverse a series of geographic waypoints and capture photos in specific orientations, and record camera position and orientation.

After the image and data capturing process has been completed, the mobile computing device may then receive the data and images in the form of UAV output data. In one embodiment, the UAV output data is modified and compressed and prepared for transmission to a server for further processing. In another embodiment, it is merely sent to the server. In another embodiment, the UAV output data is sent directly from the UAV to the server.

At the server, the UAV output data can undergo publication to an Image Database for processing by a Structure Model Generator, and Image inspection service or module. A three-dimensional reconstruction process may initially match images and may perform bundle adjustment to refine estimates of the camera exposure positions. The server then generates a regularized vector model from the images that precisely represents the dimensions of the structure.

The three dimensional reconstruction process generates an accurate design model of the structure AOI's exterior surface. The three dimensional model is a more accurate representation of the actual structure AOI being surveyed that is reconstructed entirely from real-time UAV data such that detailed construction estimates can be generated for various structural repairs, maintenance, or enhancements. In one embodiment, the server can generate a condensed report for inspection and construction estimation, and other analysis and reports.

The subject of the present disclosure provides for: (1) quickly, safely, and reliably capturing detailed and precisely geotagged imagery of an entire structure exterior or other AOI using a UAV without requiring manual piloting skills, constant control, or costly field operator trial and error of the field operator; (2) capturing imagery on demand such that the entire structure AOI is visible from a variety of perspectives for detailed remote inspection and easy recognition in less time than it takes to walk around the area without even needing to climb a ladder; (3) acquiring imagery such that accurate and complete three-dimensional reconstruction of the structure AOI can be quickly computed and a structural design wireframe model and/or a regularized vector model, of the building can be automatically derived from a dense three-dimensional point cloud; (4) providing a structural report enumerating surface type, area, condition, slope, and dimensions that can be quickly compiled from the three-dimensional wireframe or regularized vector model, photo textured polygonal mesh, and image inspection results, which is suitable for accurate repair or enhancement cost estimation; and (5) using small, lightweight, inexpensive UAVs that can be flown safely over people and locations according to FAA regulations.

DETAILED DESCRIPTION

Figure 1A:
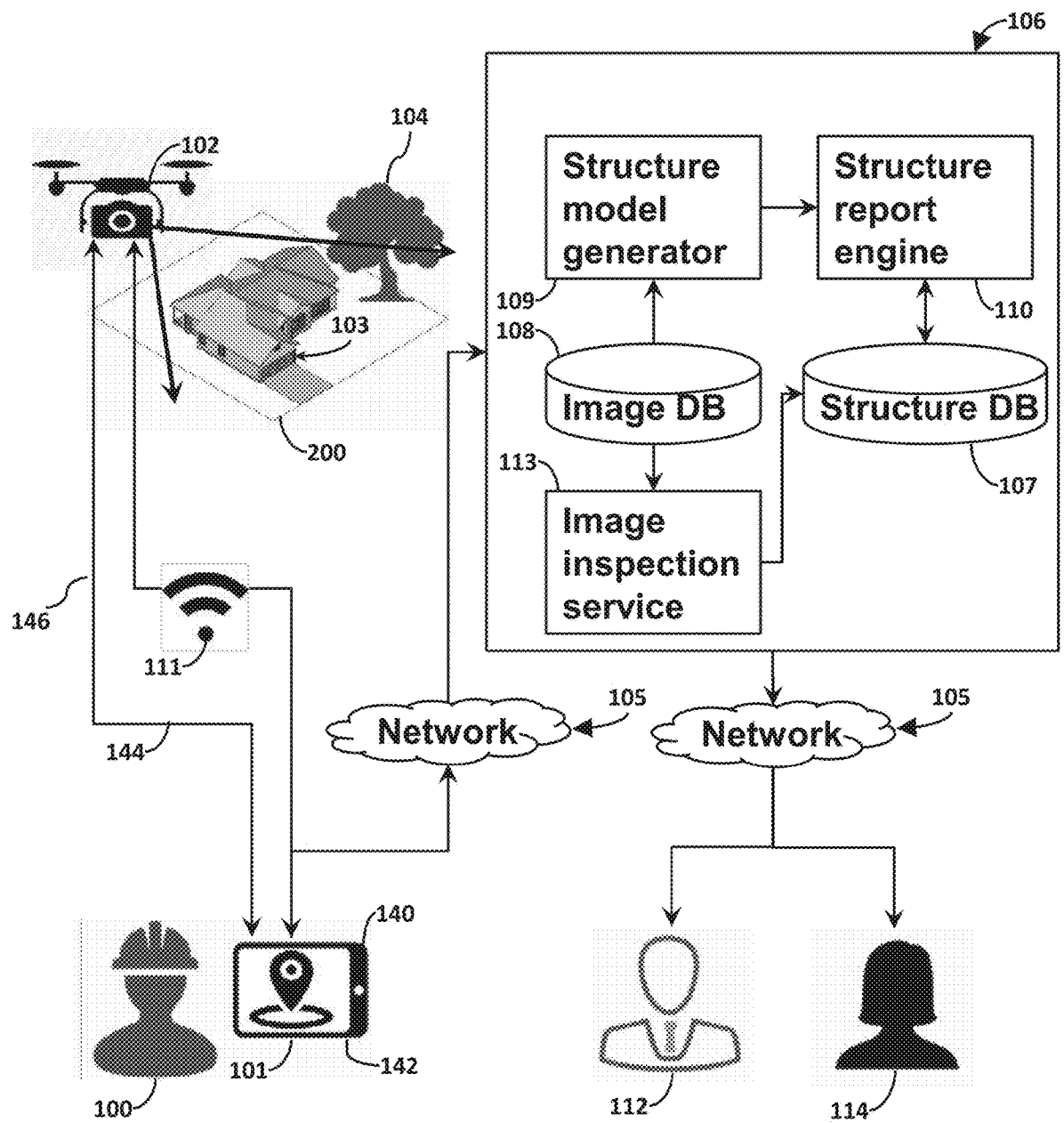
FIG. 1a is a schematic diagram of an embodiment showing the system being used to control a UAV to capture imagery of a structure.

Description of FIGS. 1 and 2—Architecture and Data Acquisition. The overview diagram shown in FIG. 1a depicts an embodiment of a data capture system and method where a field user 100 such as an insurance adjuster or roofing company estimator with a mobile computing device 101, such as a tablet, computer, smartphone, or any other device capable of functioning as described herein.

Device 101 may have an application that maintains connectivity via a local wireless network protocol 111 or other connection to a UAV or drone 102 in order to acquire geotagged images of the structure 103 while flying above common obstacles or obstructions 104, such as utility wires or trees, but within a given property boundary 200 of the building owner or manager 114.

The mobile computing device 101 may be capable of running an operating system, such as the Android or Apple operating system, that can sufficiently control a UAV 102 such as a DJI Phantom, three-dimensional Robotics Solo, Yuneec Typhoon, or Microdrone MD4 series or other UAV 102 via Wi-Fi or other connection, such that GPS geotagged imagery can be captured at desired geospatial locations and orientations. Efficiency provided by the system may be critical to minimize field labor and/or to preserve battery charge of the UAV 102, which may only allow for about fifteen to thirty minutes of safe flight time per charge.

FIG. 1a also shows how components of the data processing system and method interface to generate a report 520. At the end of or during the flight, images and data comprising UAV output data 146 can be transferred from the UAV's on board storage via Wi-Fi 111, SD card, or other method, to the mobile computing device 101 so that the application running on device 101 can compress, manipulate and securely upload images and data via a wide area network 105 or other connection to computer servers 106 running web services. In some embodiments, the UAV output data 146 can be transferred from the UAV 102 directly to a server 106, via, for example, long-term evolution (LTE) or other wired or wireless communication.

The images and their geotags may be stored in an Image Database 108 and are generally immediately made available to enterprise and other users 112 via an Image Inspection Service 113. Generally in parallel, a three-dimensional reconstruction processing of the image data set may be performed by a Structure Model Generator 109, which performs initial quality checks on the data to verify the acquired data is usable and can issue a notification to the field user 100 if data needs to be reacquired.

Once three-dimensional reconstruction and image inspection is completed, use case specific report generation is performed by a Structure Report Engine 110 where reports 520 are published into a Structure data base 107 for review by the enterprise or other user 112 and property owners 114.

Figure 1B:
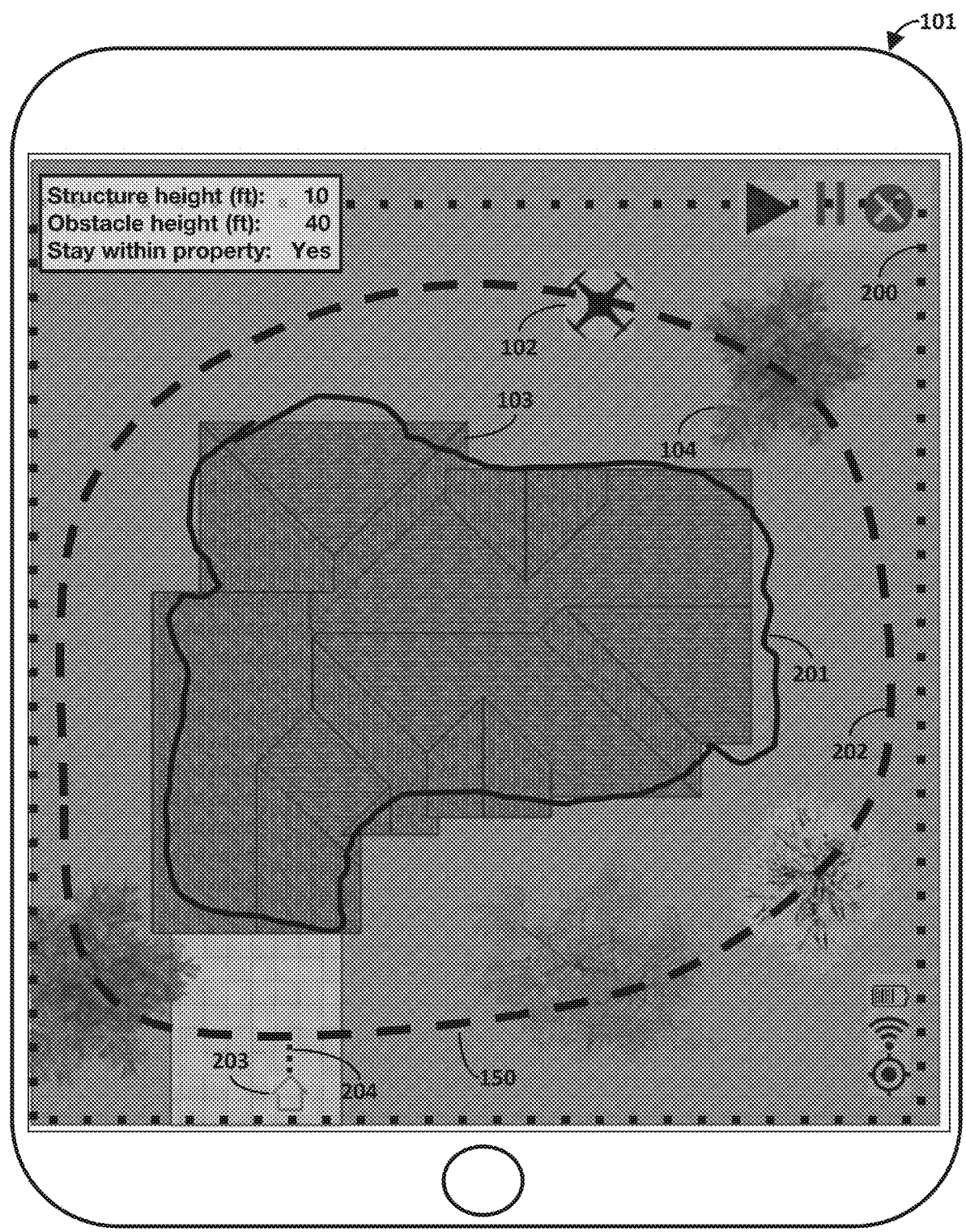
FIG. 1b is a schematic depiction of a user interface of a mobile computing application used by a field user, according to an example.

An example user interface of a mobile computing device 101 in FIG. 1b illustrates example data capture and pre-processing. An example acquisition process begins with the field user 100 initializing a network connection between the mobile computing device 101 and UAV 102 via the wireless network 111 illustrated in more detail FIG. 1a.

The mobile computing device 101 displays the launch or home location 203 where the UAV 102 was initialized and will launch from, and land near, as part of the flight plan 150. The mobile computing device 101 receives user input data 140 at least in part via the user interface of device 101, from the field user 100 which includes the property bounds 200, the structure area of interest (AOI) 201, the structure AOI's height 211, and the obstacle clearance height 210, if any.

The mobile computing device 102 allows the field user 100 to designate a polygon approximating the property bounds 200. This polygon 200 can be designated by (a) sketching with the mobile computing device 102 interface over the apparent property lines 200 in the application's map image display, (b) tracking the mobile computing device's GNSS (global navigation satellite system) or GPS (global positioning system) position as the field user 100 walks around the property perimeter 200, or (c) retrieving third party data 142.

The third party data 142 could include the geographic boundary from a public or commercially available database, based on the property mailing address or geolocation, location information from the UAV 102, or information from other sources, for example, Google Maps, and may be based on GPS location, among others.

Similarly, the structure area of interest (AOI) 201 can also be designated by either quickly sketching over the map image or tracking a GPS transect paced off by the field user 100 carrying the mobile computing device 101. The structure AOI 201 needs to crudely approximate the actual structure boundary 103 in order to avoid clipping the structure 103 from image bounds during data capture.

The structure AOI 201 height 211 and obstacle clearance height 210 may need to be numerically specified for the flight plan 150. In one embodiment the mobile computing device 101 then creates UAV control data 144 based at least in part on the user input data 140, the third party data 142, or data that is empirically derived from the UAV 102 itself, which could include GPS data or a nadir image or photo mosaic of a the property AOI 201 from a specified elevation. The UAV control data 144 is then used to create a flight plan 150 based at least in part on the UAV control data 144, which may include the property bounds 200, if specified, the structure AOI 201, the structure AOI's height 211, and the obstacle clearance height 210, if any, and other information.

This assures that images and data capturing are taken at optimal distances and intervals for three-dimensional reconstruction. In one embodiment, the UAV control data 144 defines a flight plan 150 composed of a launch trajectory 204 and an acquisition trajectory 202 that permits multiple images to be captured of the structure 103 or structure AOI 201 from a flight plan 150 well above obstacles 104.

The mobile computing device 101 may then transmit the UAV control data 144 to a UAV 102 via a communication link 111. The mobile computing device 101 allows the field user 100 to start, pause, resume, or abort the flight plan 150 and track the UAV 102 position as well as display imagery from the camera in real-time. While the acquisition trajectory 202 is paused or after it has been completed, the field user 100 can manually control the UAV 102 with or without the aid of onboard obstacle avoidance systems to for instance, capture supplemental images of interest such as close up photos of defective features before resuming the flight plan 150.

The mobile computing device 101 then executes a flight plan 150 by issuing commands to the UAV's flight and camera controller. The commands can include an orbit at a specified depression angle 1, 209, or pitch angle, that allows for complete coverage of the structure AOI 201. The mobile computing device 101 executes a flight plan 150 that also allows for omnidirectional orbital imaging that reduces obstructions both for inspection and three-dimensional reconstruction.

In other embodiments, images can be captured in multiple acquisition trajectories 202 with various fixed elevations if the structure AOI's 201 façade is highly obstructed and the use case demands a more complete reconstruction of exterior walls. Images can also be captured in multiple acquisition trajectories 202 with varying ranges to support a variety of use cases that demand higher resolution imagery. A pyramid of higher resolution imagery covering all or parts of the structure 103 can be collected for inspection purposes so that even very detailed images covering very small portions of the structure 103 can be automatically matched allowing rapid indexing of the image collection and preventing fraudulent exchange of imagery from another property. In some embodiments, an acquisition trajectory 202 can have varying elevations and be computed dynamically if an automated obstacle detection system is available on the UAV 102 or the operator manually controls the UAV elevation.

Figure 1C:
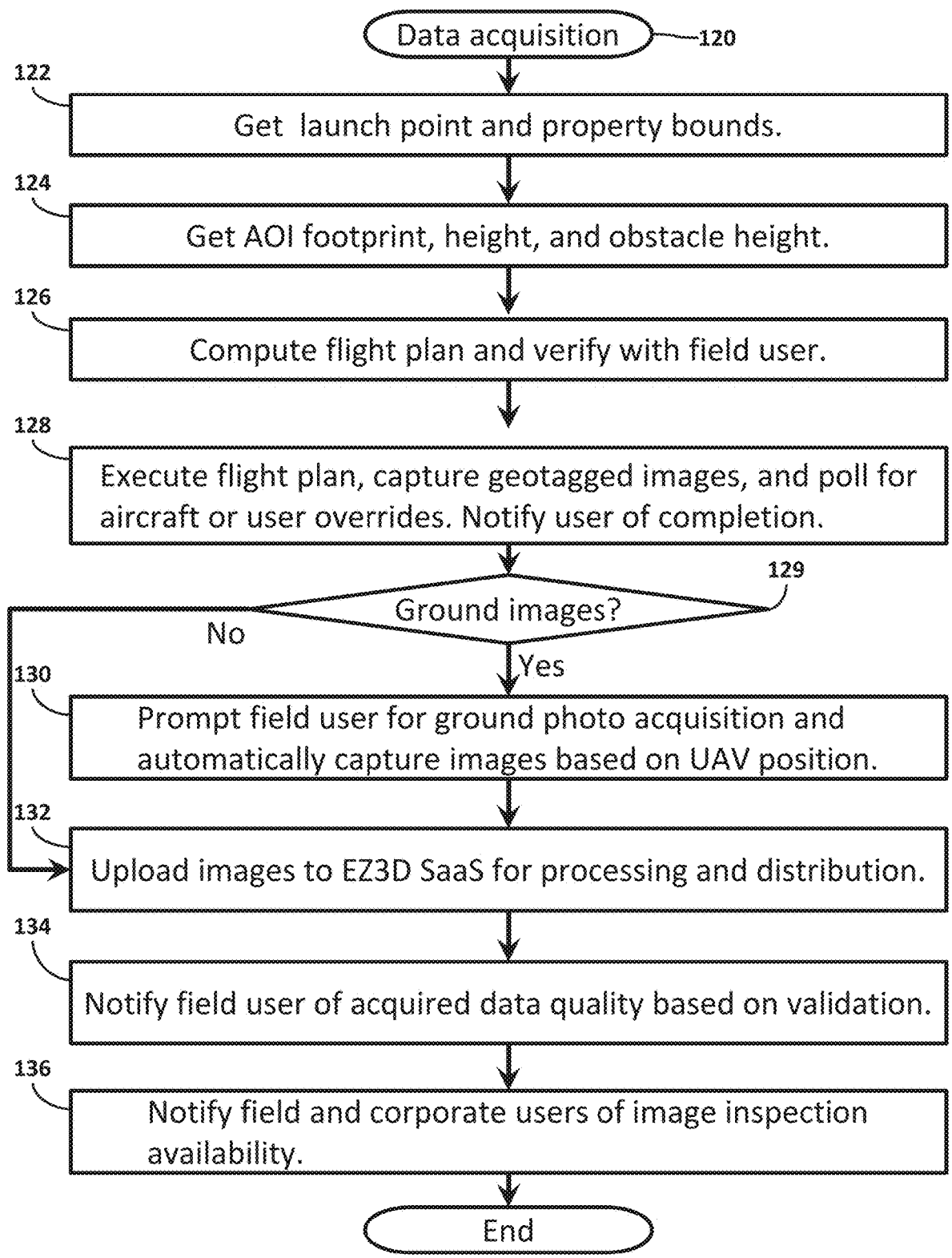
FIG. 1c depicts a method of workflow for an embodiment.

FIG. 1c provides an example method workflow diagram for data acquisition 120. The process begins at 122 by gathering user input data 140 and/or third party data 142 from the UAV's onboard flight control system for the home point 203. The property boundary polygon 200 may be received from the mobile computing device 101 via user input data 140 or from third party data 142.

Next at 124, information about the structure AOI 201, the structure's approximate height 211, and obstacle clearance height 210, such as trees, utility wires present near the structure are reviewed. With the user and/or third party inputs, the mobile computing device 101 formulates the UAV control data 144 that can compute the flight plan 150 and present it to the field user 100 for verification 126.

In an embodiment, upon user approval, the mobile computing device 101 executes the flight plan 150 using the UAV control data 144 by issuing commands to the UAV's flight and camera controller via the UAV system's API to traverse a series of geographic waypoints, and capture photos in specific orientations, and record camera position and orientation. While executing the flight plan 150, the mobile computing device 101 also has to poll for interrupts from the field user 100 to pause, resume or abort the flight plan 150. It also has to poll for interrupts from the UAV flight controller and alert the field user 100 as to flight status, such as UAV position, UAV battery charge remaining, and GNSS status. The mobile computing device 101 also allows the field user 100 to alter the flight plan 150 to, for example, alter the altitude of the fight plan 150 in order to maintain a safe height above obstacles 210 in case the obstacle elevation data was initially incorrect.

Based on whether the field user 100 requires ground level images 129, the mobile computing device 101 will enter a mode with the propeller motors disengaged to capture images while the field user 100 is holding the UAV 102 with the camera pointed towards the structure AOI 201 and traversing the flight path 130 generally. The images captured and other data constitute UAV output data 146, which is transferred from the UAV 102 to the mobile computing device 101.

In an embodiment, mobile computing device 101 may then compress or otherwise modify the images and data and transmit 132 the UAV output data 146 to a server, where the UAV output data 146 can undergo publication to the Image Database 108 for processing by the Structure Model Generator 109 and Image Inspection Service 113. The UAV output data 146 may also contain metadata comprising, for example, the UAV acquisition trajectory 202, and the time, latitude, longitude, elevation, heading, pitch, roll, deltax, deltay, deltaz, and GNSS Dilution of Precision at each exposure time.

The three-dimensional reconstruction process initially matches images and performs bundle adjustment to refine estimates of the camera exposure positions. If this is unsuccessful the problem can be characterized within minutes of upload and the field user 100 can be notified through the mobile computing device 101 that a problem occurred during acquisition 134. If the image collection passes acquisition validation, the mobile computing device 101 may provide an indication. Enterprise users 112 and other users can be notified of availability through image inspection services 136.

Figure 2A:
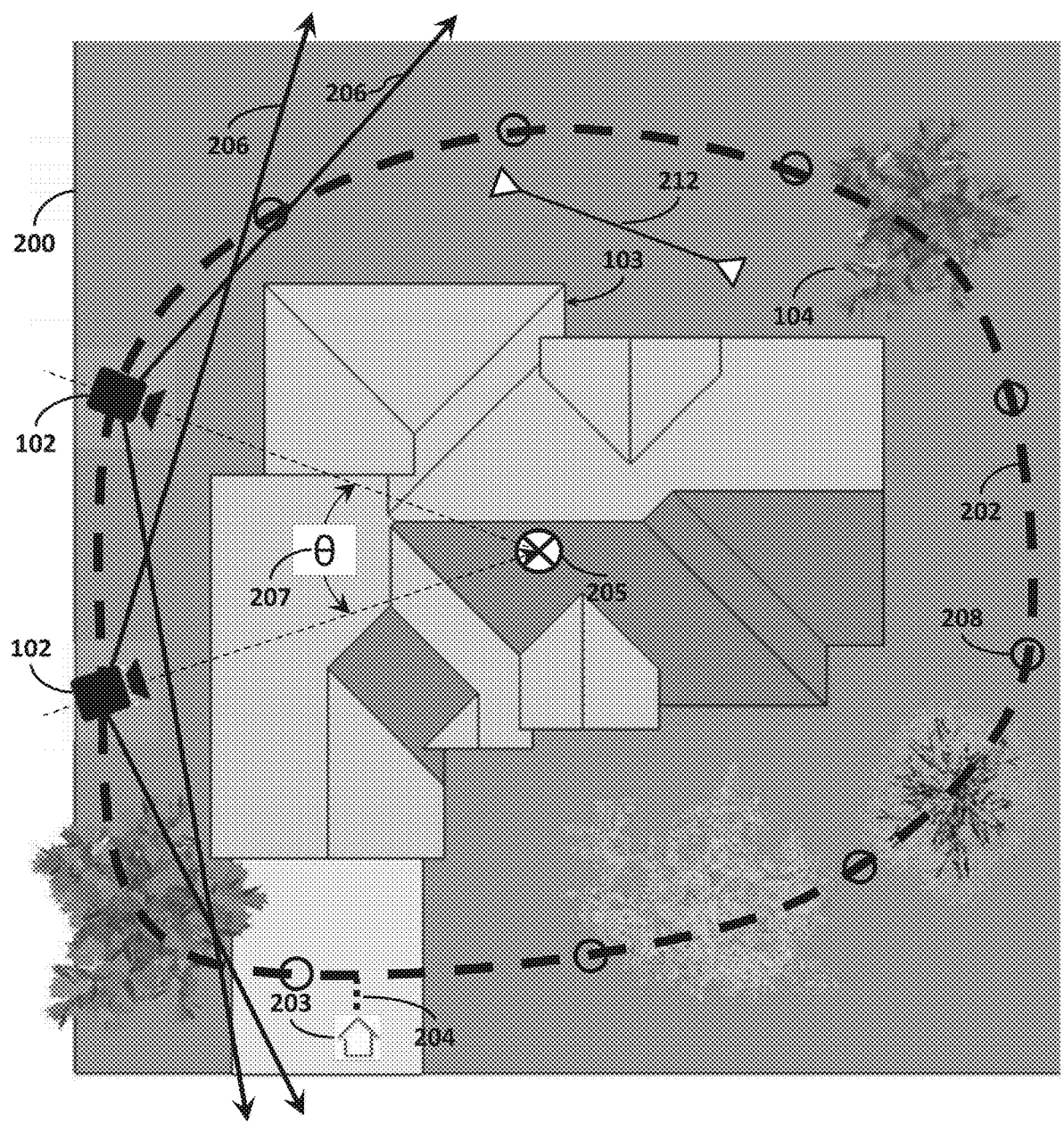
FIG. 2a is an overhead orthographic diagram, according to an embodiment.
Figure 2B:
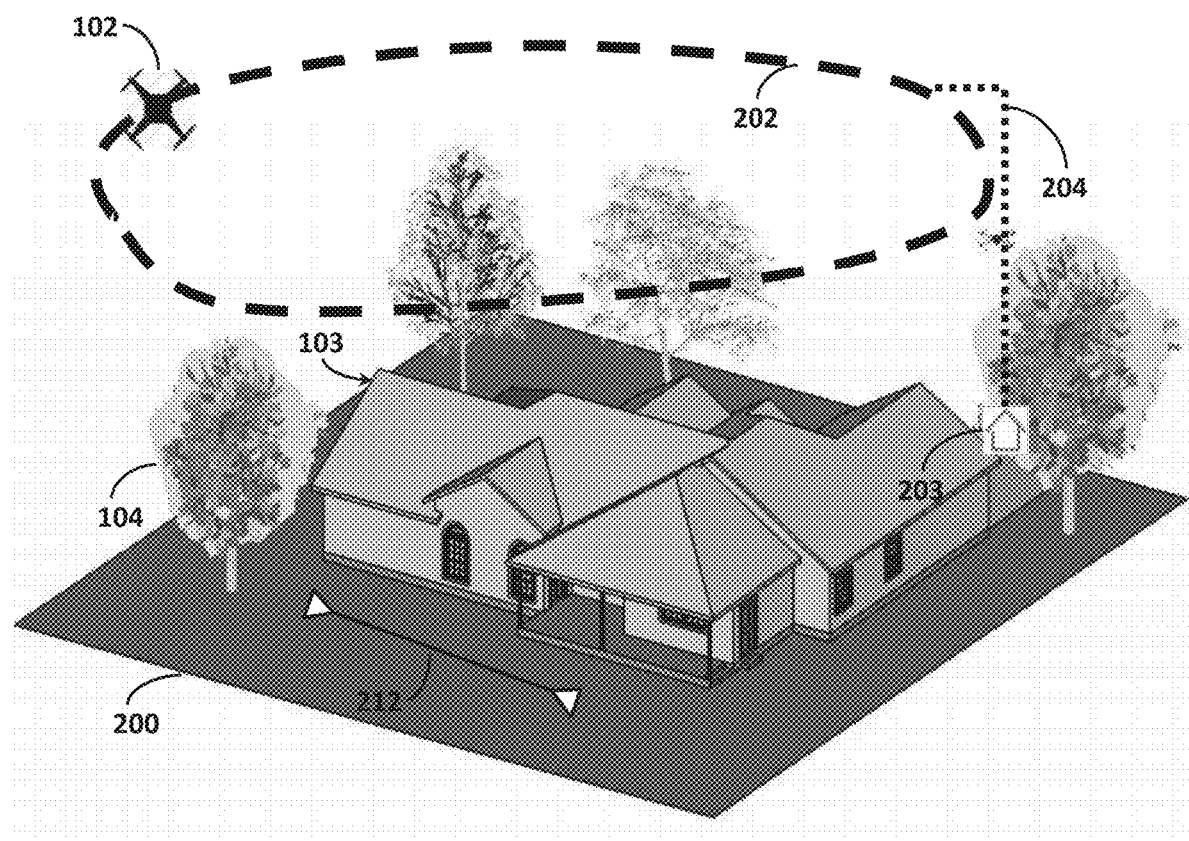
FIG. 2b is an axonometric diagram, according to an embodiment.
Figure 2C:
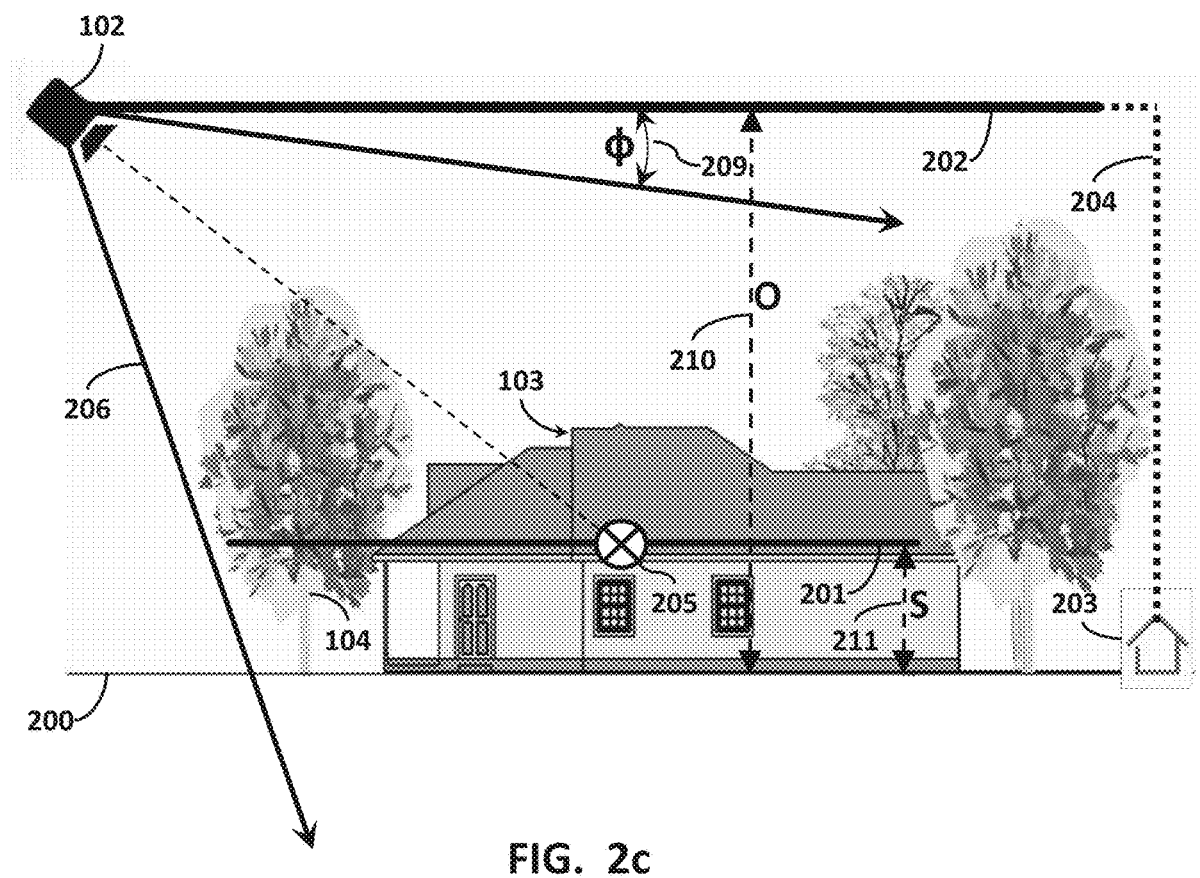
FIG. 2c is a side orthographic diagram, according to an embodiment.

FIGS. 2a, 2b, and 2c illustrate example design parameters of the data acquisition system and method that allow the system to efficiently and reliably capture data suitable for structural inspection and complete, accurate three-dimensional reconstruction with consumer grade UAV hardware by field users 100 with minimal operational training. This method allows for fully automated operation from takeoff to landing without need for any manual flight or camera controls except to override, interrupt, or abort the plan as needed.

The structure AOI 201 and optional property boundary 200 shown in FIG. 1b serve as the planimetric basis of the flight plan's 150 acquisition trajectory 202. The images are captured at camera exposure stations 208 along the trajectory 202 such that successive camera positions are angularly separated by less than an angle $\theta$ 207 with respect to the AOI centroid 205. Theta 207 is the maximum separation angle between camera positions 102 that permits reliable correlation matching during image reconstruction. In one embodiment, $\theta$ 207 is roughly 10 degrees.

The orientation of the camera at each station should be generally orthogonal to the trajectory 202 so that the UAV's camera gimbal does not need to fully yaw steer. This allows for simple gimbal hardware such as those used on the DJI Phantom 1, 2, 3 and 4 series and other popular consumer grade UAVs 102.

In an embodiment, there may be two geometric transformation algorithms that are applied to the structure AOI 201 to ensure that the camera exposure stations 208 are conducive to three-dimensional reconstruction with a UAV 102. First, a convex hull is computed that eliminates concavities in the trajectory 202 that would lead to diverging perspectives and reduced overlap between successive exposures.

Next, a dilation operation is applied with a circular structuring element with radius selected to maintain angular separation $\theta$ 207 with a minimum number of total images.

The trajectory 202 can then be constrained or clipped so that the UAV 102 does not exceed the property boundary polygon 200, if one has been specified. At this point, the acquisition trajectory 202 has been defined horizontally as shown in FIG. 2a, but a fixed elevation needs to be determined which ensures the entire structure AOI 201 will be contained within the bounds of each image frame and that the UAV 102 will maintain a minimum height above obstacles 210 as shown in FIG. 2c. In some embodiments, a higher elevation than the obstacle clearance height 210 may be needed to maintain sufficient range to image the entire structure AOI 201 while staying with the property boundary 200.

The structure bounds are defined by the structure AOI 201 horizontally and a nominal structure height 211. The UAV camera's nominal field of view 206 can be computed from the a priori focal length used in the photogrammetric solution but should be reduced by a margin that accounts for the UAV 102 and gimbal steering uncertainty during dynamic flight under windy conditions, in one example roughly ten degrees horizontally and vertically.

Furthermore, in some embodiments, the UAV's elevation must allow for camera pitch such that a minimum depression angle $\phi$ 209 is positive so that very distant features above the horizon do not lead to undesirable sky or cloud points in the point cloud produced during dense matching and to reduce glare from the sun. In these embodiments, using positive minimum depression angles $\phi$ 209 also allows for more accurate camera auto calibration. However, in other embodiments, negative minimum depression angles $\phi$ 209 may be used during the acquisition phase to, for example, capture neighboring terrain for real estate promotion. In some embodiments, the depression angle $\phi$ 209 can be set for nadir orientation when, for example, only the structure's 103 roof needs to be reconstructed or efficient broad area inspection of multiple properties is desired.

Finally, once the three dimensional acquisition trajectory 202 has been computed, the launch or approach trajectory segment 204 must be calculated such that the UAV 102 is steered from the home point 203 vertically up to the acquisition trajectory 202 elevation and then horizontally to the nearest point in the acquisition trajectory 202. This same trajectory 204 is reversed for landing after completion of the acquisition trajectory 202. This vertical launch and landing trajectory 204 method ensures the UAV 102 reaches a safe flight altitude without running into obstacles 104 such as trees and without requiring advanced obstacle detection systems most commonly found on much more costly commercial UAVs 102.

The systems and methods of the present disclosure efficiently provide for highly redundant imagery covering the vast majority of typical commercial and residential structure exteriors with dozens of images. This redundancy is very effective for (1) providing a closed loop of overlapping imagery that allows photogrammetric bundle adjustment algorithms to iteratively cancel out a variety of time varying systematic errors typical of UAV 102 systems such as GNSS position error, camera shutter timing errors, lens calibration errors, and rolling shutter distortions; (2) allowing dense matching algorithms to correlate image pairs with a sufficiently low angular separation that permits surfaces to be reconstructed with minimal point cloud voids even with limited surface texture found in many modern structural facades; (3) allowing both three-dimensional reconstruction as well as image inspection to be complete despite trees occluding portions of the structure in some images; (4) allowing the entire breadth of the structure to be visible in each image permitting immediate intuitive recognition of the image context and thereby providing more aesthetic and useful images for sales and real estate applications than nadir images or clipped oblique close up views.

The systems and methods of the present disclosure efficiently provides for highly redundant imagery with full generality of structural shape, height, obstructions, and operator errors and requires no a priori topographic or aerial image data. In practice this technique will generate a reconstruction, or regularized vector model, that is accurately scaled in all three dimensions with less than one percent systematic relative error which means, for example, that a given ten meter edge length can be modeled to within ten centimeter error despite camera position errors of individual images exceeding three meters or more.

However, some embodiments may require better photogrammetric accuracy. In these embodiments, a simple calibration target 212 can be deployed within the field of view of multiple images. In such cases, the field user 100 can position the target 212 consisting of two brightly colored objects with readily photo identifiable central points a known, fixed distance apart. In practice, painted floor tiles joined by a low stretch fastener such as Kevlar cord pulled taut is effective and easily deployed.

The center points of these targets 212 can then be identified in two or more image pairs either manually by an operator or automatically through computer vision template matching or machine learning techniques, and can be used to correct the scale of the photogrammetric solution in all three dimensions during the structure model generation phase of processing. This technique has proven to reduce model error to roughly twice the image pixel resolution or typically two centimeters over a ten meter span, an approximate five times error reduction, with negligible added expense or effort.

The same calibration method can be used in other embodiments where a GPS signal is unavailable, degraded, or where a GPS device is not embedded in the UAV 102, for instance where the UAV 102 is navigating using Simultaneous Localization and Mapping (SLAM) techniques.

Figure 3:
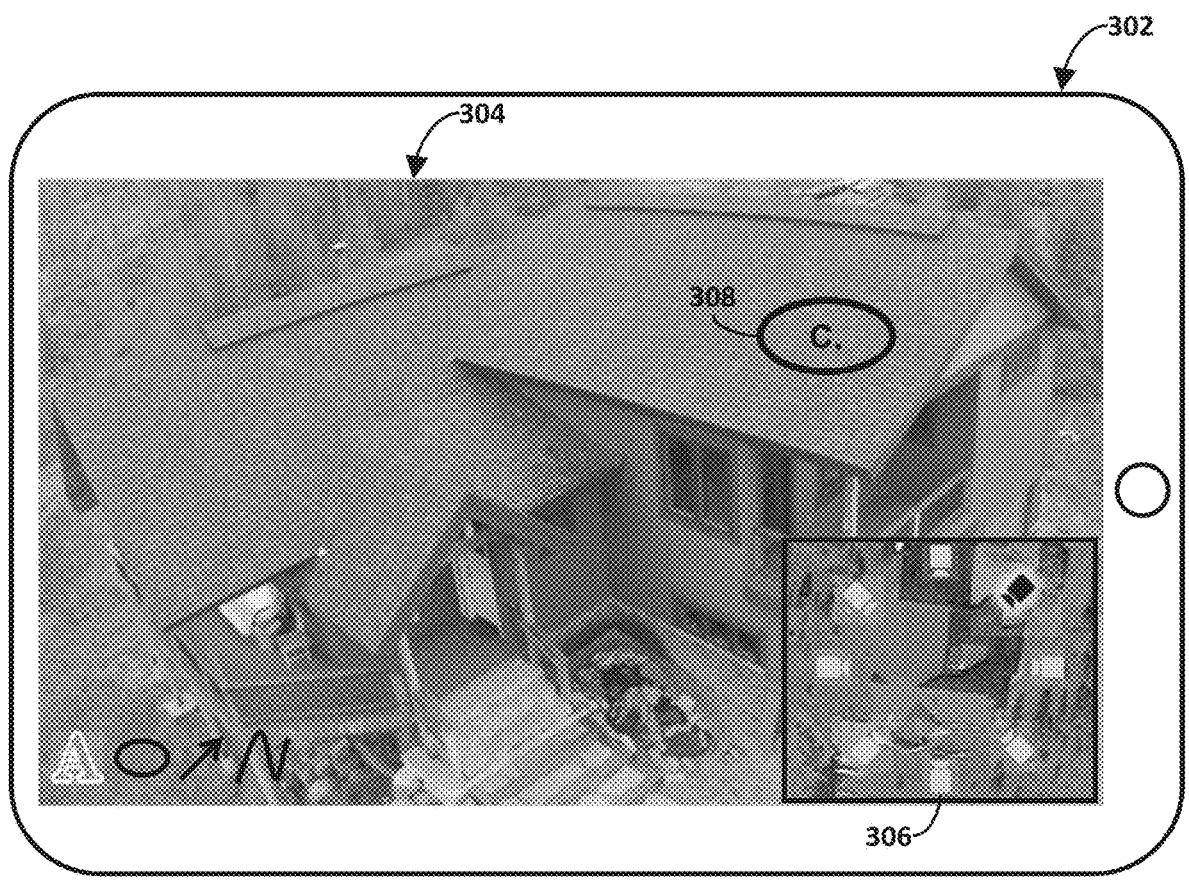
FIG. 3 is an example user interface and application snapshot illustrating one of several very high resolution oblique UAV photos selectable from a map image inset being used for structural inspection.

FIG. 3 depicts an example image on the user interface of a mobile computing device inspection application 302 that is intended for use by field users 100 for inspecting the structure AOI 201 in varying respects such as automated damage detection, assessing condition and composition of the structure 103, identifying structural features requiring maintenance, repair or replacement, assessing hazards of the site from an occupant or construction perspective, planning staging and work areas. Additionally, the imagery and associated observations recorded with the mobile computing device inspection application 302 can be used for documenting the state of the site prior to or after work has been completed.

The mobile computing device inspection application 302 as shown and described in an embodiment, may include several components, a UAV image captured from an oblique perspective 304, a map inset 306, displaying the structure AOI 201 with an overhead image map from an online map platform such as Google Maps or another source such as a UAV 102 captured nadir photo or photomosaic collected at a high altitude. The map inset 306 may also include camera perspective icons that provide the field user 100 an intuitive navigational interface for selecting images from the UAV image database 108 from varying perspectives.

The application 302 provides the field user 100 a means of adding annotations 308 to the image that can be categorized and added to the structure database 107 via image inspection service 113 as shown previously in FIG. 1a. The annotation can be recorded according to its precise image coordinates or projected to an approximate geographic position based on image orientation parameters stored in the Image Database 108, the image coordinates of the annotation, and the geographic elevation plane specified by the sum of the home point 203 elevation and the structure height 211.

The difference in image quality between the structure shown in the UAV image 304 (at reduced resolution) and the same location shown in the Google Map inset 306 (at full resolution) provides a stark example of the increased value of data provided with the present systems and methods compared to aerial photos commonly captured currently by manned aircraft.

In some embodiments, this same geographic positioning technique can be used in reverse in order to project a subset of the polygonal mesh 402 that falls outside the property boundary line 200 into image coordinates of the inspection image(s) 304 thus creating image masks corresponding to pixels within the inspection images 304 that fall outside the property owner's 114 possession or legal right to view. This process permits the system to reduce the effective image resolution of the inspection images 304 by blurring convolution in areas outside of the property 200 being surveyed and in doing so maintain compliance with privacy regulations of some governments as well as to minimize the potential risk of privacy related law suits.

Description FIGS. 4 and 5—Structure Model and Report. FIG. 4a shows a three-dimensional polygonal photo textured mesh model of a building viewed orthographically from overhead 402, according to an embodiment. It is essentially an orthographic image, or true orthomosaic, rendered from a three dimensional model that was reconstructed from the UAV output data 146, more specifically comprising a collection of oblique UAV images such as the example image 304.

Figure 4A:
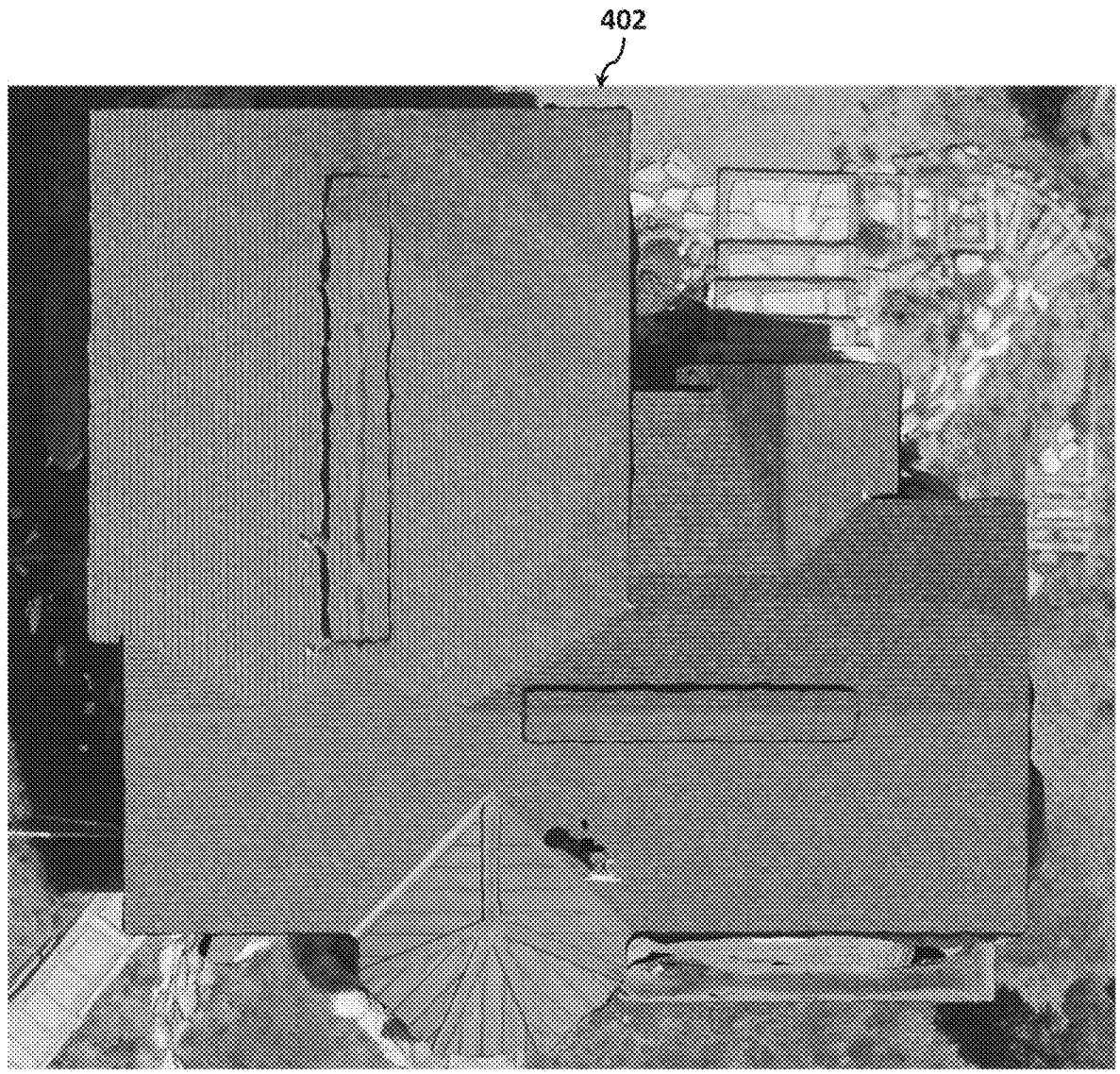
FIG. 4a illustrates an example of a three-dimensional polygonal photo textured mesh of a building viewed from overhead that was automatically generated from a collection of oblique UAV acquired images such as the one shown in FIG. 3.

FIG. 4a 402 provides a convenient image underlay when editing or validating three-dimensional vector models in a variety of Computer Aided Design (CAD) products such as AutoCAD or SketchUp without needing to contend with camera model parameters and coordinate systems which greatly complicate vector to image registration in such CAD packages. FIG. 4a also offers a more precise visual reference than conventional overhead photos because it is an exact orthographic projection containing image features that are not shifted by parallax based on their elevation.

Figure 4B:
FIG. 4b illustrates an example of a three-dimensional dense point cloud of a building viewed from overhead that was generated from oblique UAV acquired images such as the one shown in FIG. 3.

FIG. 4b shows a three-dimensional dense point cloud 404 colorized by photos used for dense stereo matching during photogrammetric reconstruction of the UAV oblique images, according to an embodiment. It is similar to the mesh rendering 402 but contains white voids where the three-dimensional reconstruction was incomplete due to obstructions or low correlation during stereo image matching. The mesh 402 photo texture has been projected onto facets that were derived from the point cloud 404.

Figure 4C:
FIG. 4c shows an example of a three-dimensional dense point cloud of the building shown in FIG. 4b, viewed from oblique and ground level cross section perspectives.
Figure 4C:
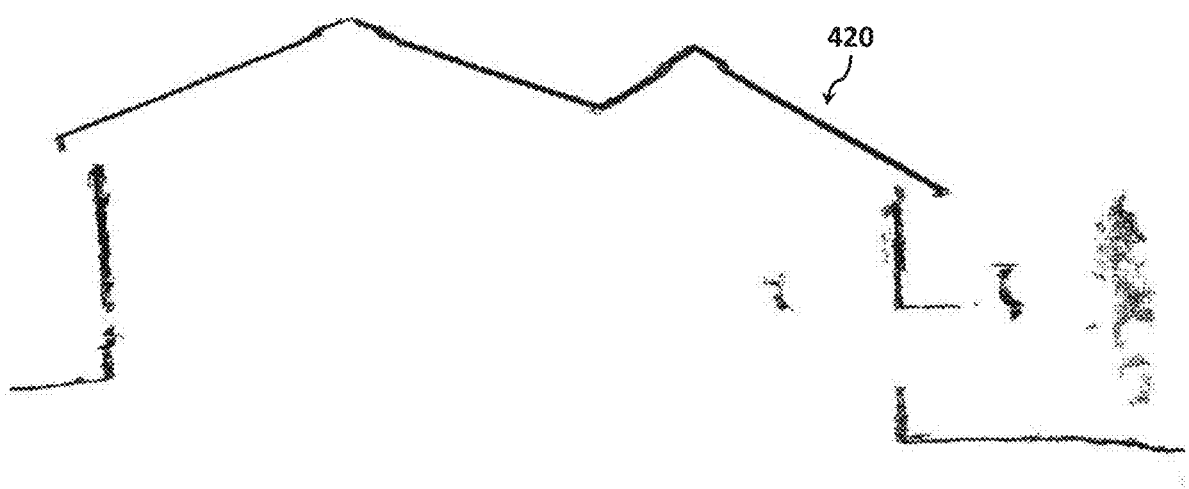

The point cloud 404 is therefore a more accurate geometric reference of the structure as can be seen when viewed from other perspectives a shown in FIG. 4c. Here the same point cloud 404 viewed from oblique perspective 410 reveals nearly complete reconstruction of roof and wall surfaces. The point cloud's 404 vertical precision is most evident from a cross section view 420 where geometric noise is minimized compared to photogrammetric results in prior art.

Both point cloud 404 and mesh 402 representations contain thousands or even millions of elements covering many small features of the structure AOI 201 and do not directly provide overall dimensions of the primary structural facets needed for a cost estimate. The system and methods disclosed herein are capable of providing yield point cloud density over the entire structure surface which is substantially uniform ranging from 100-10,000 points per square meter even for low contrast metal surfaces. This is ten times to a hundred times greater density than conventional aerial LIDAR surveys while retaining at least two centimeters vertical precision, for example, in some embodiments one millimeter to two centimeters vertical precision. Such density and precision in the point cloud 404 greatly simplifies and improves reliability of later automated steps in the building modeling process.

Figure 5A:
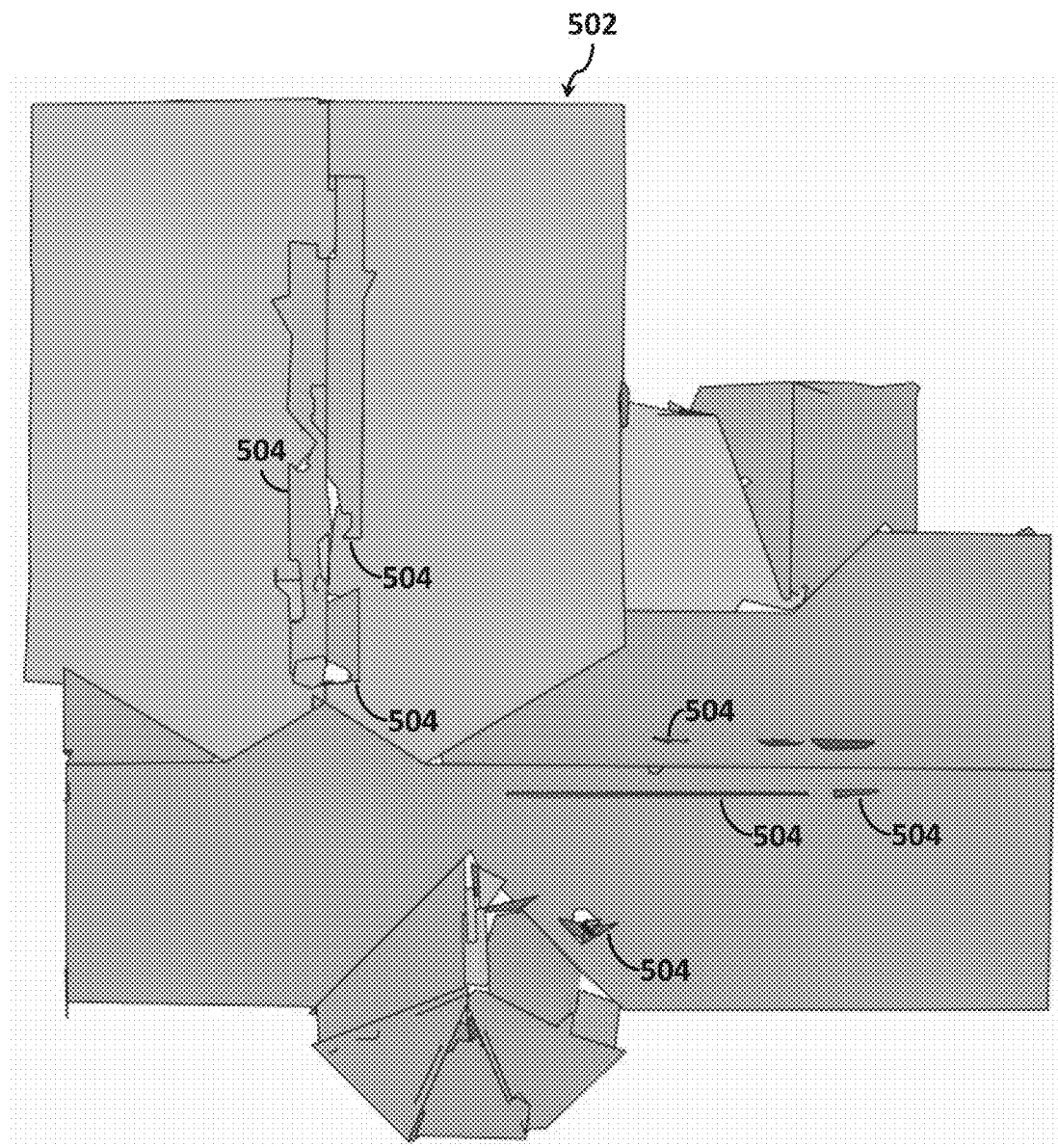
FIG. 5a illustrates an example of a three-dimensional polygonal facets of an intermediate building model viewed from overhead as shaded surfaces that were generated from the three-dimensional dense point cloud shown in FIG. 5b.

FIG. 5a shows polygonal facets of an intermediate building model 502 viewed from the same orthographic overhead perspectives as shown previously in FIGS. 4a and 4b. This example representation begins to approximate overall facet dimensions. However, there are extraneous facets or artefacts 504 of this model that in some embodiments may be undesirable for a succinct design model.

Figure 5B:
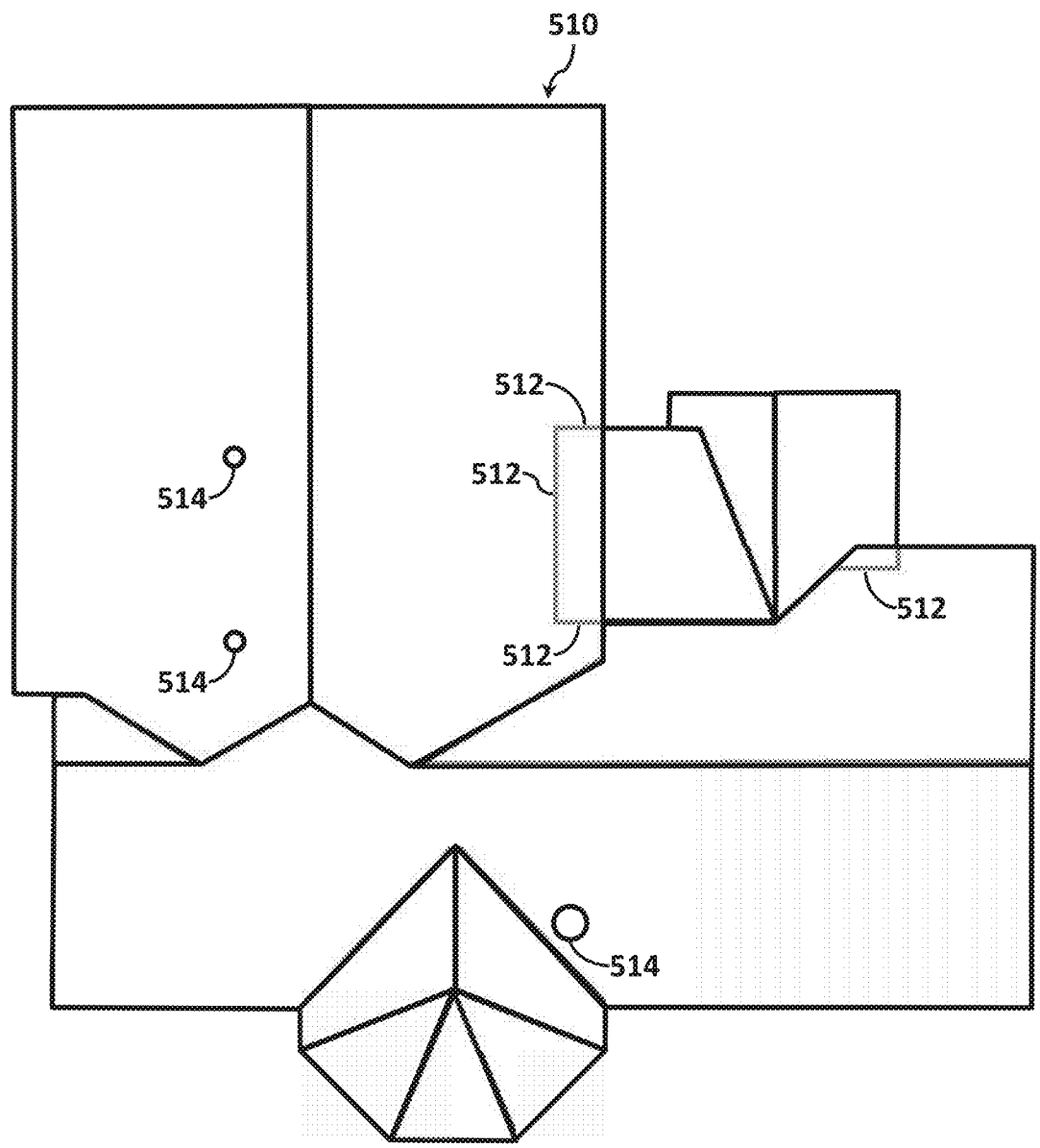
FIG. 5b illustrates an example of a three-dimensional building model viewed from overhead as a wireframe generated from the three-dimensional polygonal facets (from FIG. 6a) and photo textured mesh (from FIG. 5a).

FIG. 5b depicts a watertight regularized wire frame vector building model 510 from an overhead orthographic perspective, according to an example. This regularized vector model 510 lacks the extraneous facets 504 apparent in the previous figure (FIG. 5a) as well as the gaps, small jagged edge segments, and irregular edge angles. This cohesive facet relationship is commonly referred to as watertight because the edges abut perfectly without gaps. This clean appearance is standard for professional CAD models and presents the structure without distracting artefacts. Watertight geometry of the present systems and methods also allows for the classification and measurement of seam lengths which are crucial to roof repair estimation.

In embodiments where three-dimensional printing is desired, watertight geometry is needed in order for the printed object to be structurally sound during and after fabrication. The hidden edges 512 illustrate that this is a general and complete three-dimensional model with some edges that lie beneath some facets rather than a so called two-point-five-dimensional model where only one facet surface can occur over a given ground coordinate.

Additional manually added features 514 are also present in this model 510 that were not evident or completely portrayed in the previous version 502. These features 514 are exemplary of model details that can be added by an operator using the polygonal mesh 402 as a visual reference for portraying features not evident in the point cloud 404 or well segmented in the initial vector model 502.

Figure 5C:
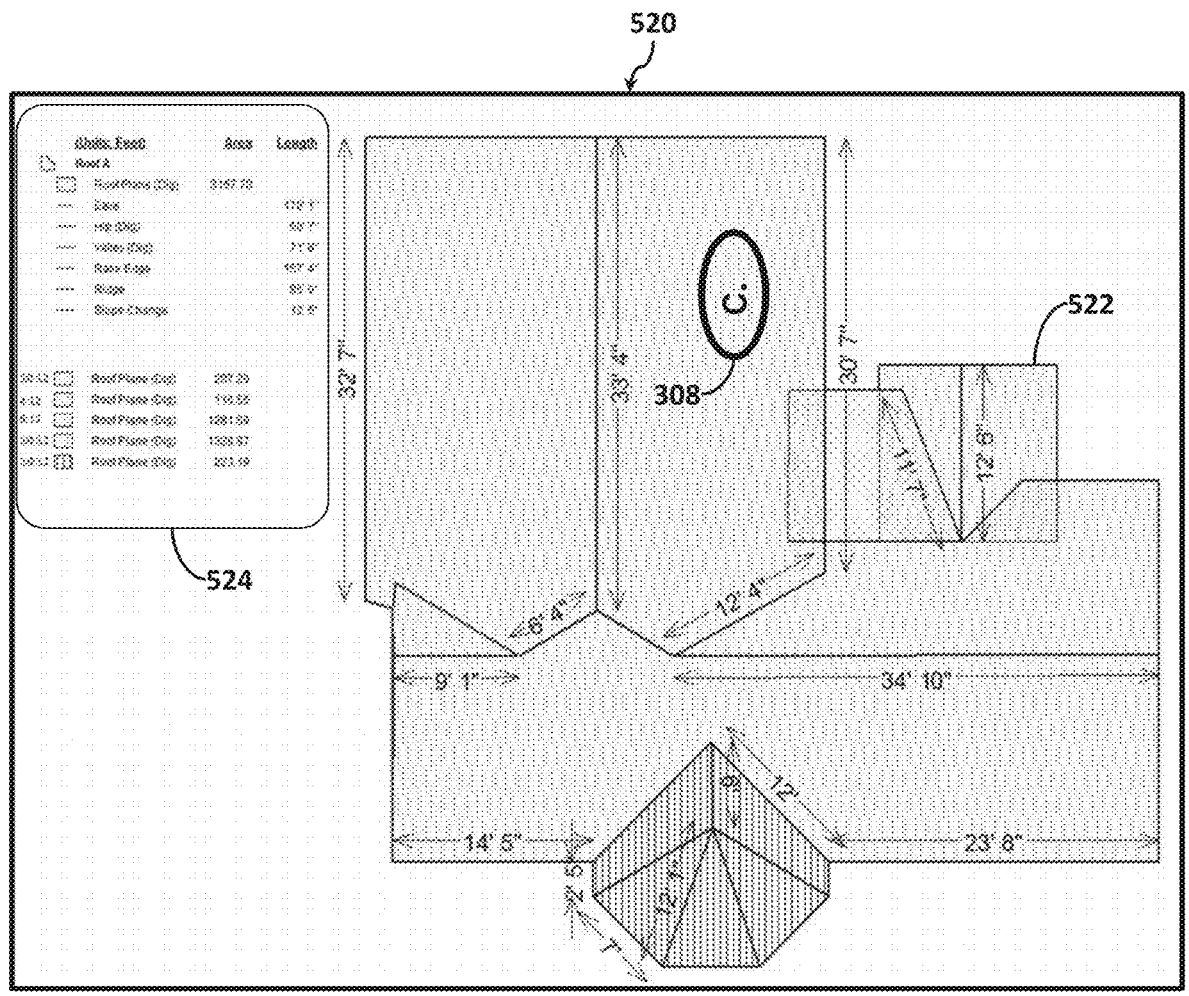
FIG. 5c depicts an excerpt from an exemplary "aerial CAD" structural report used for roof repair use cases.

The end product of an embodiment is shown in FIG. 5c, it is a schematic structural report for roof repair 520. The report 520 is principally composed of a schematic dimensioned design plan diagram 522 and a list of components or construction takeoff list 524 attributed with construction relevant parameters including type, overall area or length, pitch (or facet slope). The report design plan diagram 522 or component list 524 may also include attributed annotations 308 that were optionally specified by users with the example image inspection interface 302 shown in FIG. 3. The structural report 520 can also contain other industry standard components such as example aerial oblique images of the structure labeled by canonical camera direction that are not shown in FIB 5c.

Figure 6:
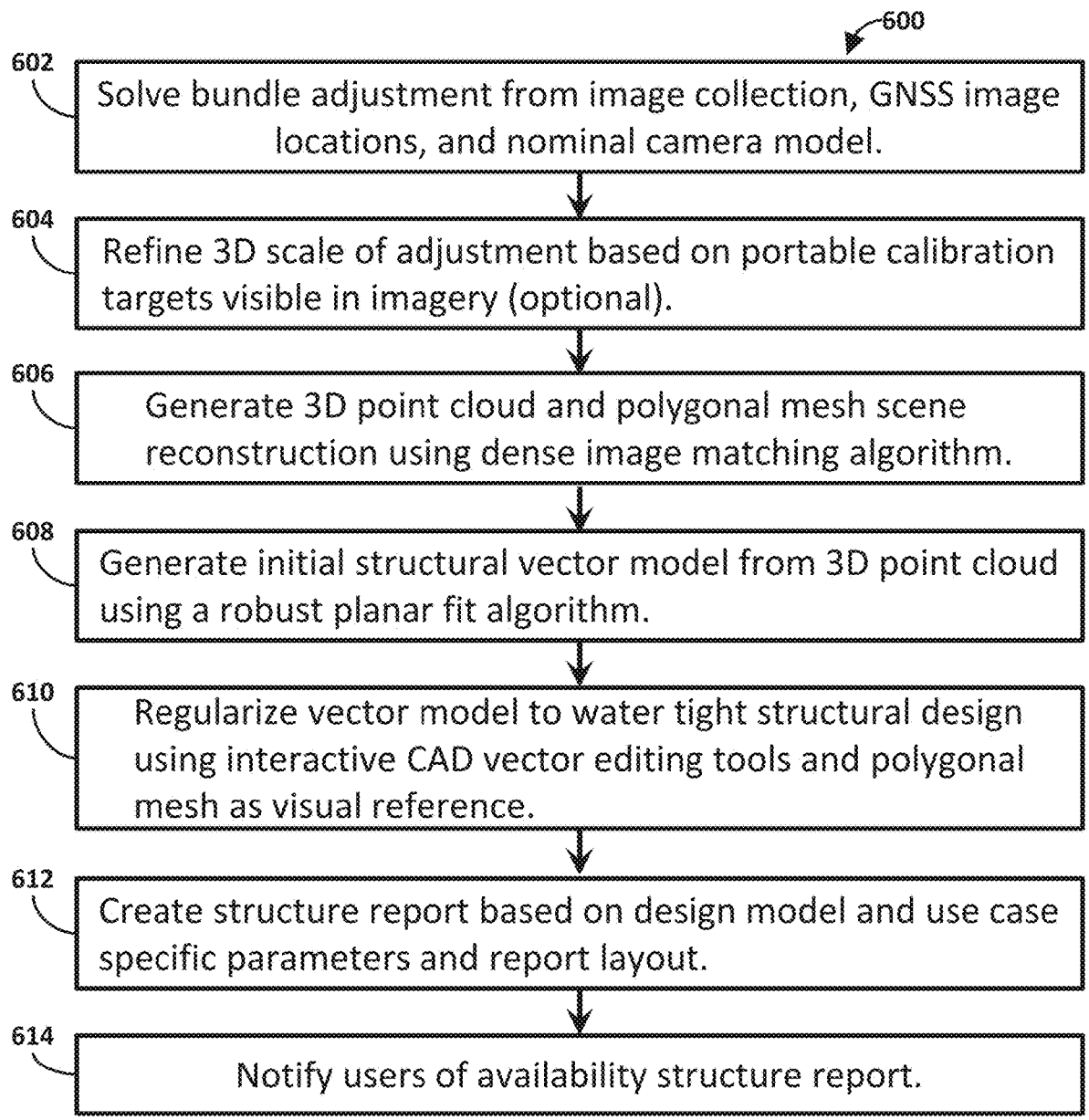
FIG. 6 depicts an example method for generating a structural model from UAV imagery and is used to generate a report suitable for estimating cost of construction.

Description FIG. 6—Image Processing Workflow. FIG. 6 provides a method workflow diagram 600 for an image processing method of an embodiment whereby a structural model is generated from UAV imagery and is in turn used for generating a report 520 suitable for estimating cost of construction or repair. Portions of the report 520 can be automatically updated if, for example, the enterprise user 112, field user 100, or internal algorithm provides additional information via the image inspection service 113 to be added to the report 520 at a later time. The process begins with the Structure Model Generator 109 retrieving a collection of images with their respective geotags and a nominal camera model from the Image Database 108 and performing standard image matching to solve for a photogrammetric bundle adjustment 602, where camera intrinsic and orientation parameters are estimated based on triangulating image tie points. The image geotags from the UAV 102 will contain various three-dimensional position errors in excess of several meters and orientation errors of ten degrees. However, these errors will be robustly corrected by bundle adjustment performed with industry standard photogrammetry products such as Pix4D Pix4Dmapper, Agisoft PhotoScan, or VisualSFM because the imagery has been collected with sufficient redundancy and geometric disparity that errors from a plurality of sources and directions can be corrected.

In some embodiments, an optional step 604 which calls for the scale of the adjustment to be modified based on portable calibration targets 212 is included if a higher degree of model accuracy is needed. This process can correct remaining systematic reconstruction scale errors in three dimensions by scaling the modeled distance between two or more calibration targets that are precisely identifiable in two or more images and that are located a known distance apart from one another.

In the next step 606, the three-dimensional point cloud 404 is generated with a dense correlation matching algorithm and a polygonal mesh 402 is in turn generated from the point cloud 404 with the aforementioned standard photogrammetry products.

In the next step 610, the point cloud 404 is input to a robust planar or conic section fit algorithm in order to create an initial structural vector model 502. Some segmentation of the point cloud 404 may be applied with standard interactive point cloud edit tools prior to generating the vector model 502 in order to reduce processing time and minimize extraneous geometry in the scene that is not part of the structure such as from ground or vegetation surfaces.

The vector model 502 can be computed from point cloud 404 using clustering algorithms such as the adaptive RANSAC (Random Sample Consensus), J-Linkage, randomized Hough transform, or the like. This representation would be sufficient in some embodiments for providing an approximate area or slope estimate of selected facets. This automated clustering step is a substantial labor saving technique inherent in this invention and although it has been presented in some references for generating buildings vector models 502 from point clouds 404 created from much more expensive and labor intensive acquisition methods such as terrestrial laser scanners or aerial LIDAR, its applicability to automated UAV acquisition, especially from safe, portable, and widely available automated UAVs, is unexpectedly effective.

A vector cleaning step 610 can be applied next where the facets of the initial structural vector model 502 are regularized with algorithms such as Ramer-Douglas-Peucker algorithm (RDP), Sleeve, Minimum Description Length (MDL), or the like. Such regularization algorithms can be easily constrained to exploit construction domain specific conventions such as maintaining edges to be perfectly horizontal or vertical, mutually coplanar, and join at angles that are modulo 7.5 degrees. When applied to successive facets, nearby vertices can be joined in order to maintain a so called watertight vector model 510 without interior gaps between adjacent facets. Extraneous facets 504 can be eliminated algorithmically based on area, perimeter, and surface normal thresholds or through interactive editing.

Embodiments using interactive editing for this process 610 can display the polygonal mesh 402 for the operator to use as a visual reference in order to verify the model portrays needed features seen in the imagery. The small roof protrusions 514 are examples of features that can be corrupted or omitted during the reconstruction 606 or model fit processes 608 but that can be restored with manual editing during creation of the regularized vector model 610 using standard solid geometry operations with a CAD package such as Autodesk Revit, Bentley MicroStation, or Trimble SketchUp. In some embodiments, machine learning techniques such as Convolutional Neural Networks can be combined with segmentation techniques such as Conditional Random Fields in order to detect and segment features that need to be either included or removed from vector models such as roof vents, chimneys, windows, trees, or power lines.

Another processing step of one embodiment is to create a report 520 with data suitable to estimate a needed construction task 612, or for other purposes. This process, may be performed by the Structure report engine 110, and uses the regularized vector model 510 as input and annotates it with descriptive information such as dimensions and selected inspection annotations 308 stored in the structure database 107 to form a report design plan diagram 522.

Another useful component of the structure report 520 is the construction takeoff list 524. Components of this list 524 can be attributed automatically from the vector model 510 geometric topology. For example, exterior wall facets are vertically oriented, roof facets are horizontal (flat) or pitched, roof eaves are horizontal edges at the bottom of roof facets, whereas roof ridges are horizontal edges at the top of roof facets. The facet edge classifications can be made within tolerances to accommodate systematic tilts of few degrees within the reconstruction due to GNSS errors.

Robust methods can then be used to eliminate the systematic tilts of the three dimensional models (402, 404, and 510) based on building construction conventions that maintain level structures to within a fraction of a degree by calculating the average or median tilt angles of various labeled edges in the vector model 510 and subtracting those tilt vectors from the models (402, 404, and 510).

Roof repair cost estimates are a function of various facet and edge attributes such as area, length, pitch, type, etc. that are listed in the takeoff list 524 and can be transferred to industry standard construction estimation software such as Xactware Xactimate. Finally, enterprise users 112 are notified 614 when the finished structure report 520 is posted to the Structure Database 107. However, in some embodiments, structural modeling steps (608, 610, 612, and 614) can be omitted for use cases where the photo textured polygonal mesh 402 or a structural vector model 502 is the desired output.

Figure 7:
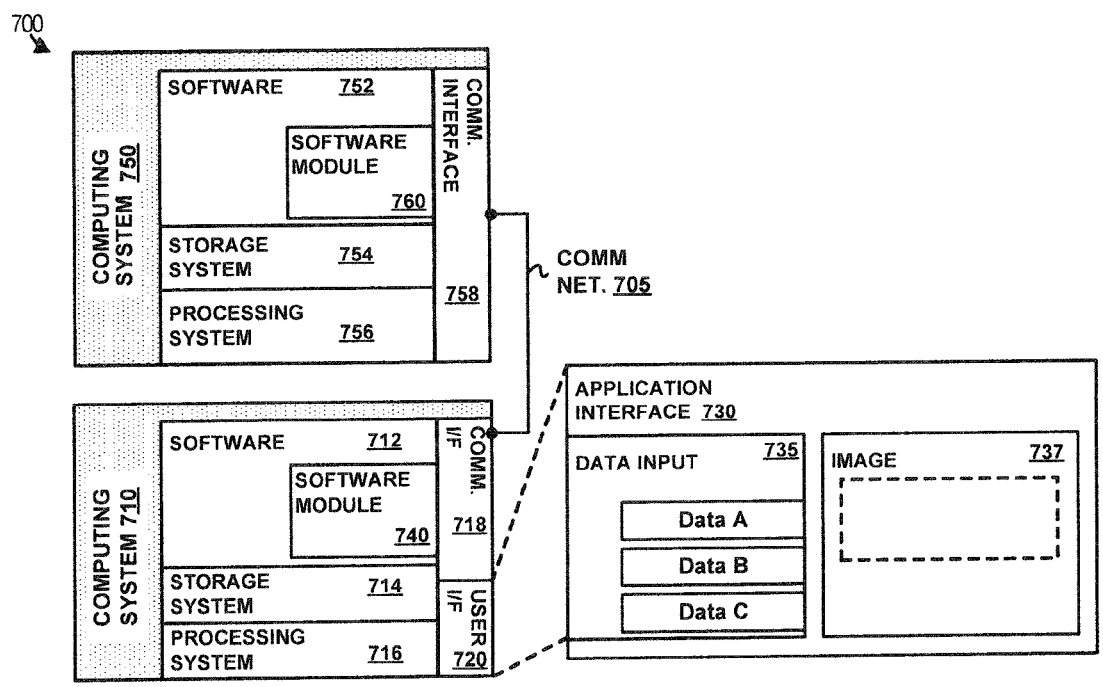
FIG. 7 is a computing environment, according to an embodiment.

FIG. 7 illustrates a monitoring computing environment 700 according to one example. Computing environment 700 includes computing system 710 and computing system 750. Computing system 710, in the present example, corresponds to mobile device 101, and computing system 750 corresponds to server 106. Computing system 710 can include any smart phone, tablet computer, laptop computer, or other computing or mobile device capable of reading, and/or recording data about systems, devices, locations, and/or equipment, etc. Computing system 750 can include any server computer, desktop computer, laptop computer, or other device capable of storing and managing the data collected by computing system 710 or other similar computing systems. Either system 710 or 750 can be capable of accomplishing any of the steps of functions described in this description.

In FIG. 7, computing system 710 includes processing system 716, storage system 714, software 712, communication interface 718, and user interface 720. Processing system 716 loads and executes software 712 from storage system 714, including software module 740. When executed by computing system 710, software module 740 directs processing system 716 to receive data, images, devices, locations, and/or equipment, etc. Such data could include any of the information described above, including but not limited to the functionality described for FIGS. 1-6.

Although computing system 710 includes one software module in the present example, it should be understood that one or more modules could provide the same operation. Similarly, the computing systems may be distributed using other computing systems and software.

Additionally, computing system 710 includes communication interface 718 that can be further configured to transmit the collected data to computing system 750 using communication network 705. Communication network 705 could include the Internet, cellular network, satellite network, RF communication, blue-tooth type communication, near field, or any other form of communication network capable of facilitating communication between computing systems 710 and 750. In some examples, communication interface 718 can further include a global positioning system to determine the location of computing system 710.

Referring still to FIG. 7, processing system 716 can comprise a microprocessor and other circuitry that retrieves and executes software 712 from storage system 714. Processing system 716 can be implemented within a single processing device but can also be distributed across multiple processing devices or sub-systems that cooperate in executing program instructions. Examples of processing system 716 include general purpose central processing units, application specific processors, and logic devices, as well as any other type of processing device, combinations of processing devices, or variations thereof. Storage system 714 can comprise any storage media readable by processing system 716, and capable of storing software 712. Storage system 714 can include volatile and nonvolatile, removable and non-removable media implemented in any method or technology for storage of information, such as computer readable instructions, data structures, program modules, or other data. Storage system 714 can be implemented as a single storage device but may also be implemented across multiple storage devices or sub-systems. Storage system 714 can comprise additional elements, such as a controller, capable of communicating with processing system 716.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal. Although one software module is shown, the software may be distributed across many devices, storage media, etc.

User interface 720 can include a mouse, a keyboard, a camera, image capture, a voice input device, a touch input device for receiving a gesture from a user, a motion input device for detecting non-touch gestures and other motions by a user, and other comparable input devices and associated processing elements capable of receiving user input from a user. These input devices can be used for defining and receiving data about the location, maps, systems, devices, locations, and/or equipment, etc. Output devices such as a graphical display, speakers, printer, haptic devices, and other types of output devices may also be included in user interface 720. The aforementioned user input and output devices are well known in the art and need not be discussed at length here.

Application interface 730 can include data input 735 and image display 737. In one example, data input 735 can be used to collect information regarding the location, property boundaries, UAV, maps, etc. It should be understood that although computing system 710 is shown as one system, the system can comprise one or more systems to collect data.

Computing system 750 includes processing system 756, storage system 754, software 752, and communication interface 758. Processing system 756 loads and executes software 752 from storage system 754, including software module 760. When executed by computing system 750, software module 760 directs processing system 710 to store and manage the data from computing system 710 and other similar computing systems. Although computing system 710 includes one software module in the present example, it should be understood that one or more modules could provide the same operation.

Additionally, computing system 750 includes communication interface 758 that can be configured to receive the data from computing system 710 using communication network 705.

Referring still to FIG. 7, processing system 756 can comprise a microprocessor and other circuitry that retrieves and executes software 752 from storage system 754. Processing system 756 can be implemented within a single processing device but can also be distributed across multiple processing devices or sub-systems that cooperate in executing program instructions. Examples of processing system 756 include general purpose central processing units, application specific processors, and logic devices, as well as any other type of processing device, combinations of processing devices, or variations thereof.

Storage system 754 can comprise any storage media readable by processing system 756, and capable of storing software 752 and data from computing system 710. Data from computing system 710 may be stored in a word, excel, or any other form of digital file. Storage system 754 can include volatile and nonvolatile, removable and non-removable media implemented in any method or technology for storage of information, such as computer readable instructions, data structures, program modules, or other data. Storage system 754 can be implemented as a single storage device but may also be implemented across multiple storage devices or sub-systems. Storage system 754 can comprise additional elements, such as a controller, capable of communicating with processing system 756.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

In some examples, computing system 750 could include a user interface. The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The aforementioned user input and output devices are well known in the art and need not be discussed at length here. It should be understood that although computing system 750 is shown as one system, the system can comprise one or more systems to store and manage received data.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An image and information capturing and processing system, comprising:
   a mobile computing device configured to:
   receive user input data and/or third party data at the mobile computing device;
   create unmanned aerial vehicle control data based at least in part on the user input data and/or the third party data;
   create a flight plan based at least in part on the unmanned aerial vehicle control data comprising a generally crude outline of the structure area of interest, wherein the flight plan insures image data are captured at orientations and intervals allowing for complete three-dimensional reconstruction and visual inspection of a structure area of interest;
   transmit the flight plan to an unmanned aerial vehicle via a communication link;
   execute the flight plan at least in part by issuing commands to flight and camera controllers of the unmanned aerial vehicle, wherein one or more acquisition trajectories with varying range and camera orientation allow image coverage of the vertical and horizontal surfaces of the structure area of interest; and
   receive unmanned aerial vehicle output data from the unmanned aerial vehicle.

2. The system of claim 1, wherein the mobile computing device transmits some or all of the unmanned aerial vehicle output data to a server via a wireless or wired communication link.

3. The system of claim 1, wherein the one or more acquisition trajectories of the flight plan include an orbital scan of oblique images comprising the entire structure area of interest.

4. The system of claim 1, wherein the one or more acquisition trajectories of the flight plan include a downward facing boustrophedonic grid scan of the top of the structure area of interest.

5. The system of claim 1, wherein the one or more acquisition trajectories of the flight plan include side facing scans of one or more vertical walls of the structure area of interest.

6. The system of claim 1, wherein images captured from one or more acquisition trajectories with the varying ranges and camera orientations are combined in a pyramid fashion, wherein high resolution photos captured at close range without high redundancy can be matched and indexed with lower resolution photos captured at far range, thus supporting efficient close up inspection, fraud detection, or three-dimensional photogrammetric reconstruction.

7. The system of claim 1, wherein the unmanned aerial vehicle output data comprises information used to create a point cloud over an entire structure area of interest, with substantially uniform density ranging from 100-10,000 points per square meter while retaining at least two centimeters vertical precision, that can be converted into a regularized vector model of the structure area of interest.

8. The system of claim 1, wherein the flight plan is at least partially defined by a launch or home location and a minimal obstacle clearance height.

9. The system of claim 1, wherein the mobile computing device displays imagery from the unmanned aerial vehicle's camera in real-time.

10. The system of claim 1, wherein the flight and camera controllers allow users to manually control the unmanned aerial vehicle to capture supplemental images of interest.

11. The system of claim 1, wherein the unmanned aerial vehicle output data comprises, at least in part, visible targets that are either separated by a precisely known distance or that correspond to features that are a measurable distance apart in a third party image archive, that may be used to calibrate the scale of the photogrammetric solution.

12. The system of claim 1, wherein the unmanned aerial vehicle output data comprises, at least in part, photos which are made available for either manual or automated inspection and annotation to facilitate rapid remote damage assessment.

13. The system of claim 1, wherein the flight and camera controllers compute the distance between the vehicle and the structure or obstacles in real-time on the mobile computing device, at least in part, by processing image frames from the live video stream being read by the mobile computing device and by computing range estimates in real-time based on motion of the unmanned aerial vehicle.

14. An image and information capturing and processing system comprising a server configured to:
receive unmanned aerial vehicle output data, wherein the unmanned aerial vehicle output data comprises geotagged images of a structure area of interest and global positioning system information, comprising highly redundant imagery with full generality of structural shape, height, obstructions, and operator errors, which requires no a priori topographic or aerial image data, that can be used to generate a reconstruction accurately scaled in three dimensions;
store the unmanned aerial vehicle output data in an image database; and
generate a three-dimensional photogrammetric point cloud and/or an orthomosaic image over the entire structure area of interest.

15. The system of claim 14, wherein the generated reconstruction maintains less than one percent systematic relative error with or without GPS/GNSS.

16. The system of claim 14, wherein the three-dimensional photogrammetric point cloud is substantially uniform ranging from 100-10,000 points per square meter.

17. The system of claim 14, wherein the three-dimensional photogrammetric point cloud retains at least two centimeters vertical precision.

18. The system of claim 14, wherein the three-dimensional photogrammetric point cloud can be converted into the regularized vector model of the structure area of interest by fitting the 3D points to planar or conic section surfaces.

19. A method of capturing and processing images automatically comprising:
receiving unmanned aerial vehicle output data by a server, wherein the unmanned aerial vehicle output data comprises image data from one or more acquisition trajectories with varying range and camera orientation, wherein the one or more acquisition trajectories include an orbital scan of oblique images where each includes the entire structure, a downward facing grid scan at close proximity of the top of the structure area of interest, or a side facing orbital scan of the walls at or near the structure height;
storing the unmanned aerial vehicle output data in an image database on the server; and
generating a three-dimensional photogrammetric reconstruction and orthomosaic image by the server over the structure area of interest.

20. The method of claim 19, wherein the three-dimensional photogrammetric reconstruction is used by the server to determine which portions, if any, of the image data acquired by the unmanned aerial vehicle include coverage of features located outside of the structure area of interest, and wherein the features located outside of the structure area of interest are obfuscated for privacy protection.

* * * * *